United States Patent
Kitano

(10) Patent No.: US 10,924,140 B2
(45) Date of Patent: Feb. 16, 2021

(54) TRANSMITTING APPARATUS AND RECEIVING APPARATUS

(71) Applicant: YAMAHA CORPORATION, Hamamatsu (JP)

(72) Inventor: Mikio Kitano, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/668,467

(22) Filed: Oct. 30, 2019

(65) Prior Publication Data

US 2020/0067547 A1 Feb. 27, 2020

Related U.S. Application Data

(63) Continuation of application No. PCT/JP2017/017891, filed on May 11, 2017.

(51) Int. Cl.
*H04B 3/02* (2006.01)
*H04B 3/50* (2006.01)
(Continued)

(52) U.S. Cl.
CPC ............... *H04B 1/10* (2013.01); *H04B 3/02* (2013.01); *H04B 3/548* (2013.01); *H04L 25/02* (2013.01); *H04B 2203/547* (2013.01)

(58) Field of Classification Search
CPC .......... H04B 1/10; H04B 1/1018; H04B 3/02; H04B 3/50; H04B 15/00; H04B 15/005
See application file for complete search history.

(56) References Cited

U.S. PATENT DOCUMENTS 6,310,408 B1 * 10/2001 Hermann ................ B60R 21/01
                                                         307/10.1
8,180,526 B2    5/2012 Ohtsuka
(Continued)

FOREIGN PATENT DOCUMENTS

CN       205584011 U  *  9/2016  .............. H02M 1/44
JP       2001326539 A    11/2001
(Continued)

OTHER PUBLICATIONS

Rohm Co., Ltd. "Ground Isolation Amplifier." Web. Nov. 13, 2015. Searched on Apr. 28, 2017. URL: http://www.rohm.co.jp/web/japan/datasheet/BA3121F/ba3121f-j. English translation provided.
(Continued)

*Primary Examiner* — Blane J Jackson
(74) *Attorney, Agent, or Firm* — Rossi, Kimms & McDowell LLP

(57) ABSTRACT

A transmitting apparatus includes a first signal outputter configured to output a first signal to a receiving apparatus via a first line; and a communicator connected to a second line that connects a receiving-side ground node and the first signal outputter with an AC connection, the receiving-side ground node being supplied with a ground potential of the receiving apparatus, and the communicator being configured to transmit a second signal from the transmitting apparatus to the receiving apparatus by causing a direct current, a magnitude of which changes based on a logic level of the second signal, to flow in the second line, or to receive the second signal from the receiving apparatus by detecting a magnitude of a direct current flowing in the second line.

15 Claims, 15 Drawing Sheets

(51) Int. Cl.
*H04B 15/00* (2006.01)
*H04B 1/10* (2006.01)
*H04B 3/54* (2006.01)
*H04L 25/02* (2006.01)

(56) References Cited

U.S. PATENT DOCUMENTS

| | | | |
|---|---|---|---|
| 9,099,967 B2* | 8/2015 | Breece, III | H03F 3/68 |
| 2011/0206208 A1* | 8/2011 | Augustyn | H04B 15/00 |
| | | | 381/1 |
| 2014/0062439 A1* | 3/2014 | Nishijima | H02M 3/33507 |
| | | | 323/282 |
| 2020/0059262 A1* | 2/2020 | Kitano | H04L 25/02 |

FOREIGN PATENT DOCUMENTS

| | | |
|---|---|---|
| JP | 2008217934 A | 9/2008 |
| WO | 2007094106 A1 | 8/2007 |

OTHER PUBLICATIONS

International Search Report issued in Intl. Appln PCT/JP2017/017891 dated Aug. 8, 2017 English translation provided.
Written Opinion issued in Intl. Appin. No. PCT/JP2017/017891 dated Aug. 8, 2017.

* cited by examiner

# TRANSMITTING APPARATUS AND RECEIVING APPARATUS

CROSS REFERENCE TO RELATED APPLICATIONS

This application is a Continuation Application of PCT Application No. PCT/JP2017/017891, filed May 11, 2017, the entire contents of which are incorporated herein by reference.

BACKGROUND

Technical Field

This disclosure relates to communication between a transmitting apparatus and a receiving apparatus.

Background Information

In a vehicle-mounted audio communication system, an audio signal may be transmitted from a transmitting apparatus to a receiving apparatus and amplified by the receiving apparatus, and the amplified signal may be used to drive a speaker. An AC potential difference, which is an AC component of a potential difference between a ground potential of the transmitting apparatus and a ground potential of the receiving apparatus, acts as a noise voltage. The noise voltage is multiplexed on the audio signal received by the receiving apparatus. Non-Patent Document 1 discloses an apparatus for removing a noise voltage from an audio signal. Non-Patent Document 1 is Isolated Amplifier for Removing Ground Noise, [online], Nov. 13, 2015, ROHM Co., Ltd. [searched on Apr. 28, 2017], Internet <URL: http://www.rohm.co.jp/web/japan/datasheet/BA3121F/ba3121f-j>

In the vehicle-mounted audio communication system, in addition to the audio signal, a data signal may be transmitted from the transmitting apparatus to the receiving apparatus. In this case, when a line is provided specifically for transmission of the data signal, there arises a drawback that the configuration becomes complicated.

SUMMARY

In view of the above circumstances, it is an object of this disclosure to reduce a noise voltage without providing a line specifically for transmission of a data signal.

A transmitting apparatus according to an aspect of this disclosure includes a first signal outputter configured to output a first signal to a receiving apparatus via a first line; and a communicator connected to a second line that connects a receiving-side ground node and the first signal outputter with an AC connection, the receiving-side ground node being configured to be supplied with a ground potential of the receiving apparatus, and the communicator being configured to transmit a second signal from the transmitting apparatus to the receiving apparatus by causing a direct current, having a magnitude configured to change based on a logic level of the second signal, to flow in the second line, or being configured to receive the second signal from the receiving apparatus by detecting a magnitude of a direct current flowing in the second line.

A transmitting apparatus according to an aspect of this disclosure includes a first signal outputter connected to a second line that is connected with an AC connection to a receiving-side ground node, the receiving-side ground node being configured to be supplied with a ground potential of a receiving apparatus, the first signal outputter being configured to generate a first signal by canceling an AC potential difference from an input signal, on which the AC potential difference is multiplexed, by being connected to the ground potential of the receiving apparatus via the second line, the AC potential difference being an alternating potential difference between a ground potential of the transmitting apparatus and the ground potential of the receiving apparatus, and to output the first signal to the receiving apparatus via a first line; and a communicator that includes a constant current circuit configured to cause a direct current, having a magnitude configured to change based on a logic level of a second signal, to flow in the first line to thereby transmit the second signal from the transmitting apparatus to the receiving apparatus.

A receiving apparatus according to an aspect of this disclosure includes a first signal inputter configured to receive a first signal from a transmitting apparatus via a first line; and a communicator connected to a second line that connects a transmitting-side ground node and the first signal inputter with an AC connection, the transmitting-side ground node being configured to be supplied with a ground potential of the transmitting apparatus, the communicator being configured to transmit a second signal from the receiving apparatus to the transmitting apparatus by causing a direct current, having a magnitude configured to change based on a logic level of the second signal, to flow in the second line, or being configured to receive the second signal from the transmitting apparatus by detecting a magnitude of a direct current flowing in the second line.

A receiving apparatus according to an aspect of this disclosure includes a first signal inputter connected to a second line that is connected with an AC connection to a transmitting-side ground node, the transmitting-side ground node being configured to be supplied with a ground potential of the transmitting apparatus, the first signal inputter being configured to generate an output signal by canceling an AC potential difference from a first signal, on which the AC potential difference is multiplexed, by being connected to the ground potential of the transmitting apparatus via the second line, the AC potential difference being an alternating potential difference between the ground potential of the transmitting apparatus and a ground potential of the receiving apparatus, and to output the output signal; and a communicator that includes a constant current circuit configured to cause a direct current, having a magnitude configured to change based on a logic level of a second signal, to flow in the first line to thereby transmit the second signal from the receiving apparatus to the transmitting apparatus.

DESCRIPTION OF THE EMBODIMENTS

Embodiments according to this disclosure will now be described with reference to the accompanying drawings. Set out in the embodiments described below are specific examples of this disclosure that include various preferred technical limitations. It is of note that the scope of this disclosure is not limited to the examples described below unless otherwise specified in the description of this disclosure.

1. First Embodiment

Figure 1A:
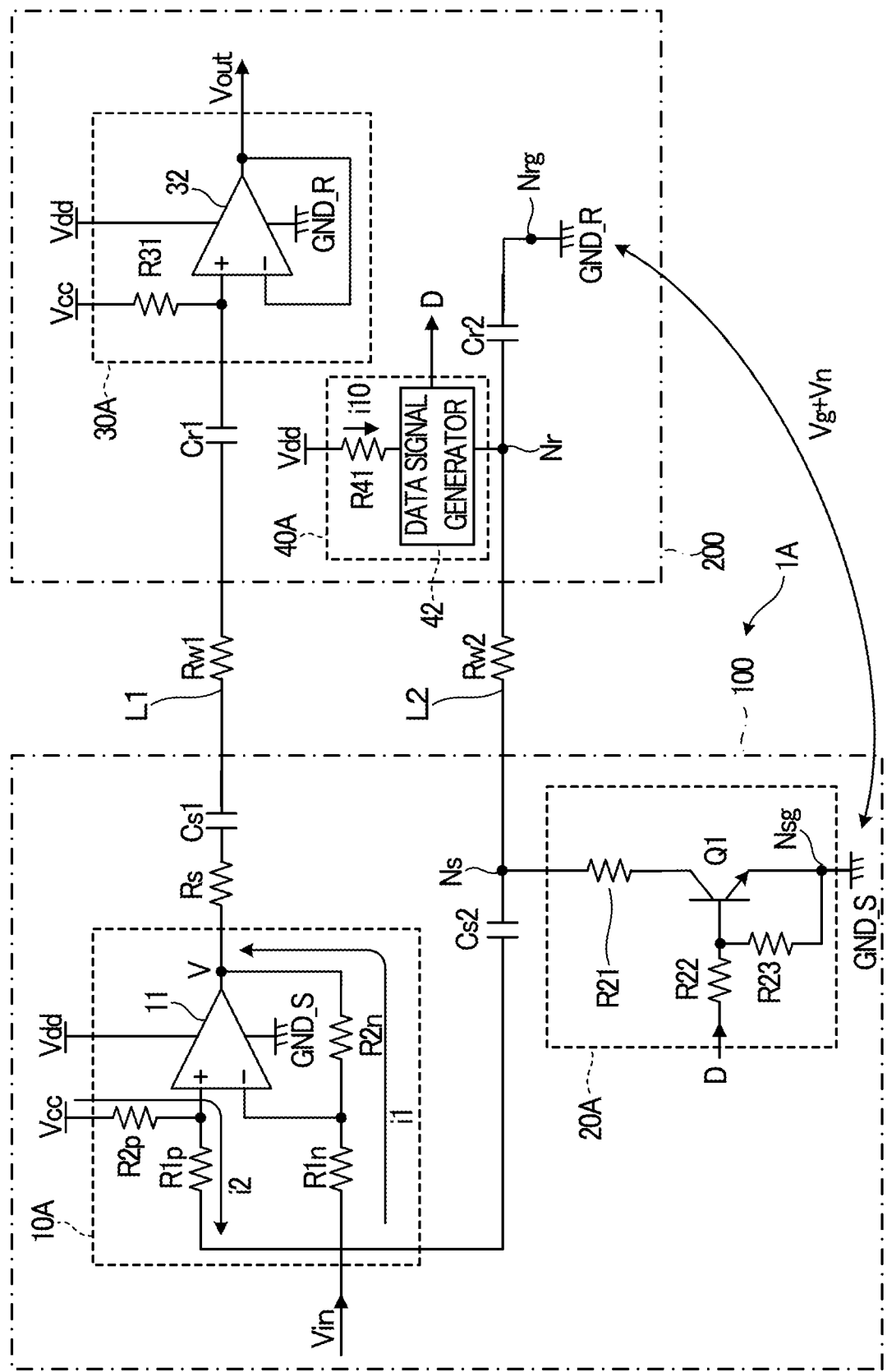
FIG. 1A is a circuit diagram illustrating a configuration of a signal transmitting system 1A according to a first embodiment according to this disclosure.

A signal transmitting system 1A according to this embodiment will now be described. The signal transmitting system 1A is used, for example, in a vehicle-mounted audio communication system. FIG. 1A illustrates a circuit diagram of the signal transmitting system 1A. The signal transmitting system 1A includes a transmitting apparatus 100, a first line L1, a second line L2, and a receiving apparatus 200. In FIG. 1A, "Rw1" denotes an equivalent resistance of the first line L1, and "Rw2" denotes an equivalent resistance of the second line L2. The transmitting apparatus 100 transmits an audio signal V to the receiving apparatus 200 via the first line L1. In this embodiment, the audio signal V (first signal) is an analog signal. The receiving apparatus 200 generates an output audio signal Vout based on the audio signal V. The second line L2 connects a receiving-side ground node Nrg and an audio signal outputter 10A (first signal outputter) with an AC connection. The audio signal outputter 10A is, for example, audio signal output circuitry. The AC connection means a connection via one or more capacitance elements. A receiving-side ground potential GND_R, which is a ground potential of the receiving apparatus 200, is applied to the receiving-side ground node Nrg. A transmitting-side ground potential GND_S, which is a ground potential of the transmitting apparatus 100, is applied to a transmitting-side ground node Nsg.

An AC potential difference Vn may be generated between the transmitting-side ground potential GND_S and the receiving-side ground potential GND_R. For example, in a situation in which a digital processing circuit configured to perform a digital processing on the output audio signal Vout is provided in the receiving apparatus 200, the AC potential difference Vn is generated when a return current that is output from the digital processing circuit flows from the receiving apparatus 200 to the transmitting apparatus 100. Alternatively, the AC potential difference Vn is generated when a current generated in other electrical components flows into the transmitting apparatus 100 via a vehicle body in a situation in which the receiving apparatus 200 and the transmitting apparatus 100 are connected to the vehicle body that is grounded. The AC potential difference Vn acts as a noise voltage. Further, a DC potential difference Vg may be generated, in addition to the AC potential difference Vn, between the receiving-side ground potential GND_R and the transmitting-side ground potential GND_S. When the receiving-side ground potential GND_R is used as a reference, the transmitting-side ground potential GND_S is obtained by multiplexing the AC potential difference Vn on the DC potential difference Vg.

The transmitting apparatus 100 includes the audio signal outputter 10A (first signal outputter), the transmitting-side ground node Nsg, a data signal transmitter 20A, a resistance element Rs, a first transmitting-side capacitance element Cs1, and a second transmitting-side capacitance element Cs2. The audio signal outputter 10A outputs the audio signal V (first signal) to the receiving apparatus 200 via the first line L1.

The data signal transmitter 20A transmits a data signal D (second signal) from the transmitting apparatus 100 to the receiving apparatus 200 via the second line L2. The data signal D may indicate any information, for example, presence or absence of a failure in the transmitting apparatus 100.

An input audio signal Vin is supplied to the audio signal outputter 10A, and the receiving-side ground potential GND_R is applied to the audio signal outputter 10A via the second line L2. The input audio signal Vin is generated on the basis of the transmitting-side ground potential GND_S. Therefore, when the receiving-side ground potential GND_R is used as a reference, the AC potential difference Vn, which acts as a noise voltage, is multiplexed on the input audio signal Vin. The audio signal outputter 10A generates the audio signal V by canceling the AC potential difference Vn from the input audio signal Vin.

The audio signal outputter 10A includes resistance elements R1p, R2p, R1n, and R2n, and an operational amplifier 11. A power supply potential Vdd and the transmitting-side ground potential GND_S are applied to the operational amplifier 11.

One terminal of the resistance element R1p is connected to the second transmitting-side capacitance element Cs2, and the other terminal thereof is connected to a positive input terminal of the operational amplifier 11. In other words, the positive input terminal of the operational amplifier 11 is connected to the receiving-side ground node Nrg with an AC connection via the resistance element R1p and the second line L2. One terminal of the resistance element R2p is connected to the positive input terminal of the operational amplifier 11, and a bias potential Vcc is applied to the other terminal of the resistance element R2p. With respect to the bias potential Vcc, Vcc=Vdd/2+Vg+Vn+GND_R is established. That is, the AC potential difference Vn is multiplexed on the bias potential Vcc.

The power supply potential Vdd and the bias potential Vcc are generated by a power supply, not illustrated. One terminal of the resistance element R1n is supplied with the input audio signal Vin, and the other terminal thereof is connected to a negative input terminal of the operational amplifier 11.

One terminal of the resistance element R2n is connected to the negative input terminal of the operational amplifier 11, and the other terminal of the resistance element R2n is connected to an output terminal of the operational amplifier 11.

The electric potential of the positive input terminal of the operational amplifier 11 is determined by a current i2 flowing via the resistance element R2p and the resistance element R1p. The current i2 is an alternating current. An AC component of a voltage, which is the AC potential difference Vn, is obtained by subtracting the receiving-side ground potential GND_R from bias potential Vcc (=Vdd/2+Vg+Vn), and is applied to the resistance element R2p. Therefore, a voltage obtained by dividing the AC potential difference Vn by the resistance element R2p and the resistance element R1p is supplied to the positive input terminal of the operational amplifier 11.

Here, it is assumed that the resistance values of the resistance elements R1p and R1n are r1, and that the resistance values of the resistance elements R2p and R2n are r2, and the AC component is focused on.

Since an imaginary short circuit is established between the positive input terminal and the negative input terminal of the operational amplifier 11, the following Equation (1) holds.

$$Vin-r1*i1=r2*i2 \quad (1)$$

Since no current flows into the operational amplifier 11 having a high input impedance, Equations (2) and (3) illustrated below are satisfied.

$$i1=(Vin-V)/(r1+r2) \quad (2)$$

$$i2=Vn/(r1+r2) \quad (3)$$

When Equation (2) and Equation (3) are substituted into Equation (1), Equation (4) is obtained.

$$V=r2/r1*(-Vin+Vn) \quad (4)$$

Assuming that the resistance value r2 and the resistance value r1 are equal to each other, Equation (5) is obtained.

$$V=-Vin+Vn \quad (5)$$

Since the input audio signal Vin is generated based on the transmitting-side ground potential GND_S, the AC potential difference Vn is multiplexed on the input audio signal Vin when the receiving-side ground potential GND_R is used as a reference. As is clear from Equation (5), the audio signal V is obtained by canceling the AC potential difference Vn, which is multiplexed on the input audio signal Vin, from the input audio signal Vin.

More generally, assuming that the resistance values of the resistance elements R1p, R1n, R2p and R2n are r1p, r1n, r2p and r2n respectively, and that r2p/r1p=r2n/r1p is satisfied, the AC potential difference Vn can be canceled out.

In this way, in the audio signal outputter 10A, the input audio signal Vin is supplied to the negative input terminal of the operational amplifier 11 via the resistance element R1n, and the AC potential difference Vn is applied to the positive input terminal of the operational amplifier 11 via the resistance element R2p and the resistance element R1p.

The data signal transmitter 20A is connected to the second line L2 at a transmitting-side node Ns, and transmits a direct current, a magnitude of which is changed based on a logic level of the data signal D (second signal), to the second line L2, thereby transmitting the data signal D from the transmitting apparatus 100 to the receiving apparatus 200. The data signal transmitter 20A includes resistance elements R21, R22, and R23, and a transistor Q1. The resistance element R21 is provided between the transmitting-side node Ns and the collector of the transistor Q1. The transistor Q1 is of the NPN type. One terminal of the resistance element R22 is connected to the base of the transistor Q1, and the other terminal thereof is supplied with the data signal D. The resistance element R23 is provided between the base and emitter of the transistor Q1. The transistor Q1 is turned on when the logic level of the data signal D is high, and is turned off when the logic level of the data signal D is low. When the transistor Q1 is turned on, the potential of the second line L2 is pulled down to the transmitting-side ground potential GND_S via the resistance element R21. Therefore, a direct current flows via the second line L2. On the other hand, when the transistor Q1 is turned off, the direct current does not flow to the second line L2. Therefore, when the receiving apparatus 200 detects the direct current flowing via the second line L2, the data signal D can be received.

Next, the receiving apparatus 200 includes an audio signal inputter 30A, a data signal receiver 40A, a first receiving-side capacitance element Cr1, a second receiving-side capacitance element Cr2, and the receiving-side ground node Nrg. The audio signal inputter 30A is, for example, audio signal input circuitry. The audio signal inputter 30A acts as a buffer. The audio signal inputter 30A includes a resistance element R31 and an operational amplifier 32. The power supply potential Vdd and the receiving-side ground potential GND_R are applied to the operational amplifier 32. The bias potential Vcc is applied to one terminal of the resistance element R31, and the other terminal of the resistance element R31 is connected to a positive input terminal of the operational amplifier 32. The positive input terminal of the operational amplifier 32 is connected to the first receiving-side capacitance element Cr1. The bias potential Vcc is applied to the positive input terminal of the operational amplifier 32 via the resistance element R31. Further, a negative input terminal and an output terminal of the operational amplifier 32 are connected to each other. The operational amplifier 32 acts as a voltage follower. The operational amplifier 32 outputs the output audio signal Vout at a low impedance.

The data signal receiver 40A is connected to a receiving-side node Nr of the second line L2. The data signal receiver 40A includes a resistance element R41 and a data signal generator 42. The power supply potential Vdd is applied to one terminal of the resistance element R41. The data signal generator 42 is connected to the other terminal of the resistance element R41. The data signal generator 42 is provided between the other terminal of the resistance element R41 and the receiving-side node Nr. The data signal generator 42 detects the magnitude of a direct current flowing along a path from the resistance element R42 via the receiving-side node Nr to the second line L2. The data signal generator 42 compares the detected magnitude of the direct current with a threshold value. The data signal generator 42 generates the data signal D based on the comparison result.

The second receiving-side capacitance element Cr2 is provided between the receiving-side node Nr and the receiving-side ground node Nrg. The receiving-side ground potential GND_R is input to the transmitting apparatus 100 via the second receiving-side capacitance element Cr2, the second line L2, and the second transmitting-side capacitance element Cs2.

In this embodiment, the data signal D is transmitted from the transmitting apparatus 100 to the receiving apparatus 200 via the second line L2. When the logic level of the data signal D is low, the transistor Q1 is turned off. In this case, the second line L2 and the transmitting-side ground node Nsg are separated from each other. In this state, the AC potential difference Vn is not applied to the audio signal outputter 10A via the second line L2. On the other hand, when the logic level of the data signal D is high, the transistor Q1 is turned on. In this case, the AC potential difference Vn is entered into the second line L2 as a noise voltage.

Figure 1B:
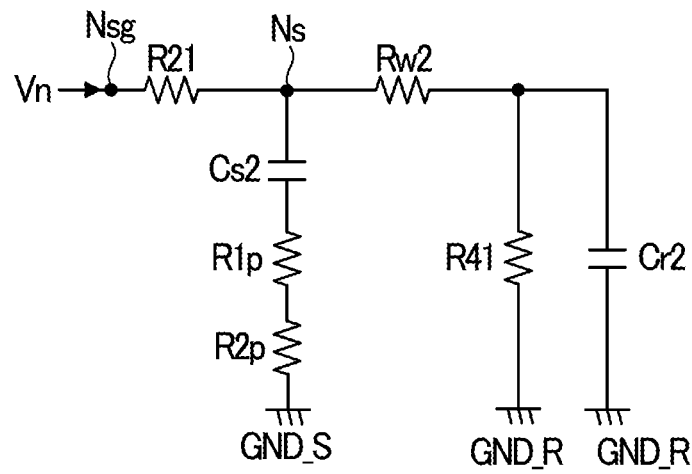
FIG. 1B is a circuit diagram illustrating an equivalent circuit with respect to an AC component when viewing a second line L2 side from a transmitting-side ground node Nsg.
Figure 1C:
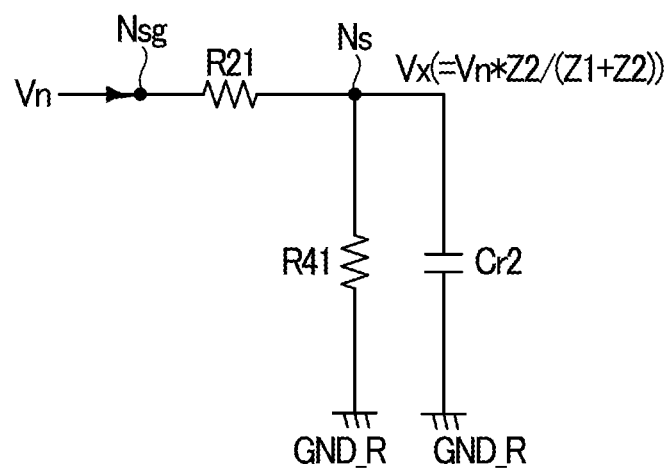
FIG. 1C is a circuit diagram illustrating an equivalent circuit with respect to the AC component when viewing the second line L2 side from the transmitting-side ground node Nsg.

FIG. 1B illustrates an equivalent circuit with respect to the AC component when viewing the second line L2 from the transmitting-side ground node Nsg. In FIG. 1B, the resistance value of the equivalent resistance Rw2 of the second line L2 is about 0.3 ohms. The resistance value of the equivalent resistance Rw2 is small and can be negligible in comparison with the other elements. Moreover, the resistance values of the resistance elements R1p and R2p are sufficiently large compared to the resistance value of the resistance element R41. Accordingly, the resistance elements R1p and R2p can be negligible. Therefore, a substantial equivalent circuit with respect to the AC component when viewing the second line L2 from the transmitting-side ground node Nsg is as illustrated in FIG. 1C.

Here, it is assumed that an impedance of the second receiving-side capacitance element Cr2 is sufficiently large. It is assumed that a first impedance Z1 is an impedance of the data signal transmitter 20A (resistance value of the resistance element R21) when viewed from the second line L2. In addition, it is assumed that a second impedance Z2 is an impedance of the data signal receiver 40A (resistance value of the resistance element R41) when viewed from the second line L2. In this case, a noise voltage Vx entered in the transmission node Ns is obtained by dividing the AC potential difference Vn by the first impedance Z1 and the second impedance Z2.

That is, $Vx=Vn*Z2/(Z1+Z2)$ is established.

Therefore, in order to reduce the noise voltage Vx, it is preferable that the first impedance Z1 is larger than the second impedance Z2. It is more preferable that $Z2/Z1<0.2$ is established. For example, when the resistance value of the resistance element R21 is 4.7 k ohms and the resistance value of the resistance element R41 is 680 ohms, a condition for reducing the noise voltage Vx is satisfied. Further, increasing the capacitance value of the second receiving-side capacitance element Cr2 in order to lower an impedance of the second receiving-side capacitance element Cr2 is equivalent to lowering the resistance value of the resistance element R41 in accordance with a rise in the frequency of an input signal. Therefore, it is effective to reduce the entering of the noise voltage Vx in the audio band.

Next, the Common Mode Rejection Ratio (CMRR) in the signal transmitting system 1A will be described with reference to the comparative example. A signal transmitting system 1Z according to the comparative example illustrated in FIG. 3 differs from the signal transmitting system 1A, which transmits the data signal D via the second line L2, in that the data signal D is transmitted from the transmitting apparatus 100 to the receiving apparatus 200 via the first line L1.

In the signal transmitting system 1Z, the AC potential difference Vn is cancelled in the audio signal V output from the audio signal outputter 10A. However, when the transistor Q1 is turned on, the AC potential difference Vn is entered into the first line L1 via a path from the transmitting-side ground node Nsg through the transistor Q1 to the resistance element R21. When respective impedances of the resistance element Rs and the first transmitting-side capacitance element Cs1 are reduced, the AC potential difference Vn entered in the first line L1 can be reduced. However, since the first line L1 has a capacitive component, the load of the audio signal outputter 10A is capacitive. In order to prevent oscillation of the audio signal outputter 10A and to ensure stability of operation of the audio signal outputter 10A, there is a limit to reducing the resistance value of the resistance element Rs. Therefore, even if the impedances of the resistance element Rs and the first transmitting-side capacitance element Cs1 are adjusted, the AC potential difference Vn entered in the first line L1 cannot be sufficiently reduced.

When the audio signal V is supplied to the first line L1 in a situation in which the transistor Q1 is turned on, a current flowing toward the resistance element R41 is modulated by the audio signal V.

Figure 3:
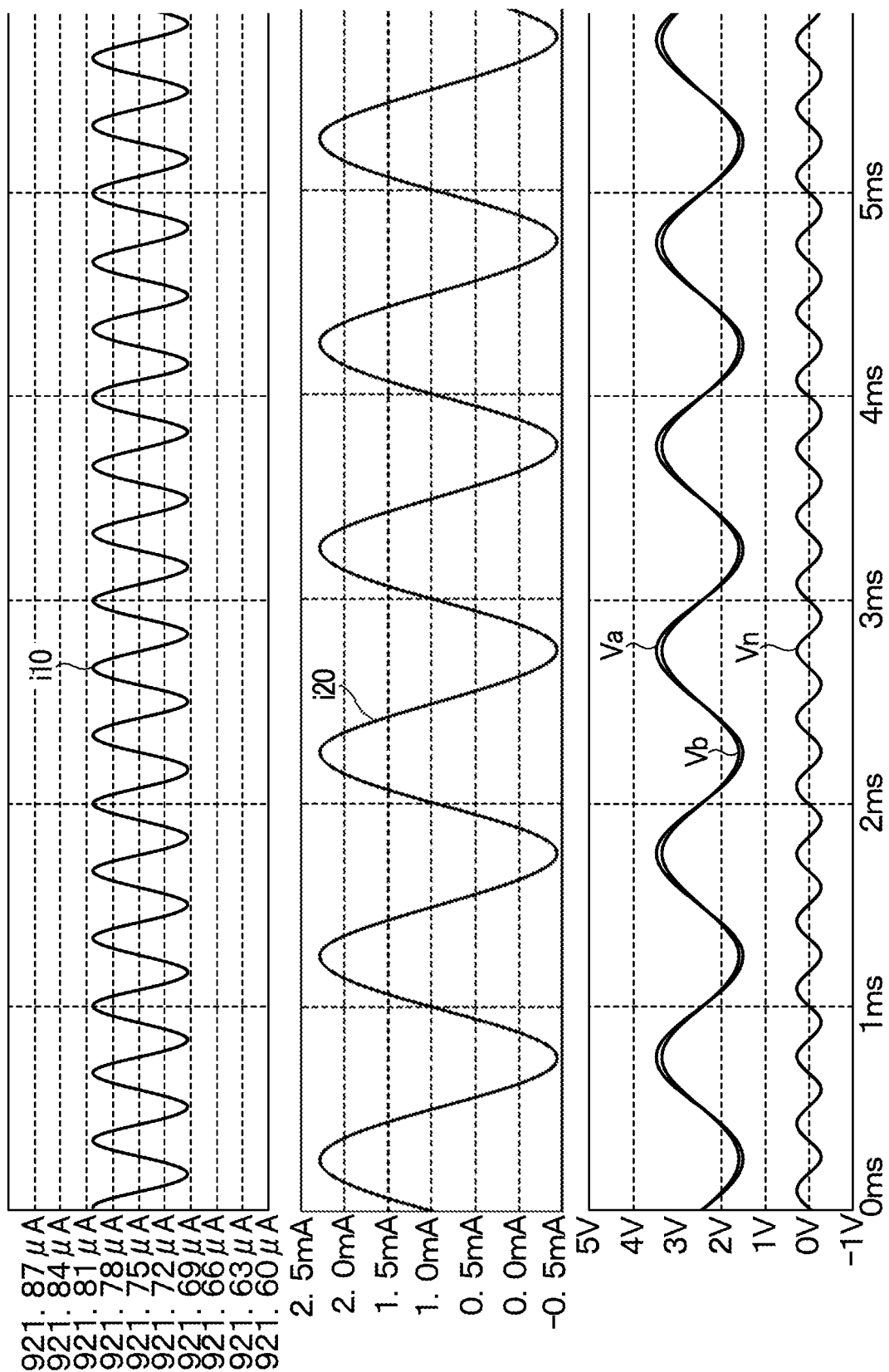
FIG. 3 is a graph illustrating a voltage waveform and a current waveform.

Here, in the signal transmitting system 1A, it is assumed that the current flowing toward the resistance element R41 is "i10," and that the audio signal output from the audio signal inputter 30A is "Va." In the signal transmitting system 1Z, it is assumed that a current flowing via the resistance element R41 is "i20," and the audio signal output from the audio signal inputter 30A is "Vb." FIG. 3 illustrates the results of the simulation of the current i10, the current i20, the audio signal Va, and the audio signal Vb. In FIG. 3, A worst balance of the differential amplification shown in FIG. 3. Specifically, the resistance value of the resistance element Rs is 47 ohms, the resistance value of the equivalent resistance Rw1 is 0.3 ohms, the resistance value of the resistance element R31 is 100 k ohms, the resistance value of the resistance element R21 is 4.7 k ohms, the resistance value of the resistance element R41 is 680 ohms, the audio signal V is 1 kHz/1 Vpeak, the AC potential difference Vn is set to 3 kHz/0.3 Vpeak, and the rate of the error of the resistance value for each of the resistance elements R1p, R2p, R1n and R2n is 0.01 percent. As illustrated in FIG. 3, in the signal transmitting system 1Z, the current i20 flowing toward the resistance element R41 is about 2 mA when the level of the audio signal V is the minimum, and is about 0 mA when the level of the audio signal V is the maximum. Therefore, in the signal transmitting system 1Z, the data signal generator 42 needs to perform filtering for reducing the AC component of the current i20.

In contrast, in the signal transmitting system 1A, the current i10 flowing toward the resistance element R41 is modulated by the AC potential difference Vn, which is applied to the second line L2. However, the amplitude of the AC potential difference Vn is as small as about 1/10 as compared with the amplitude of the audio signal V. Therefore, since the amplitude of the current i10 is small, the data signal D can be generated without filtering.

Figure 4:
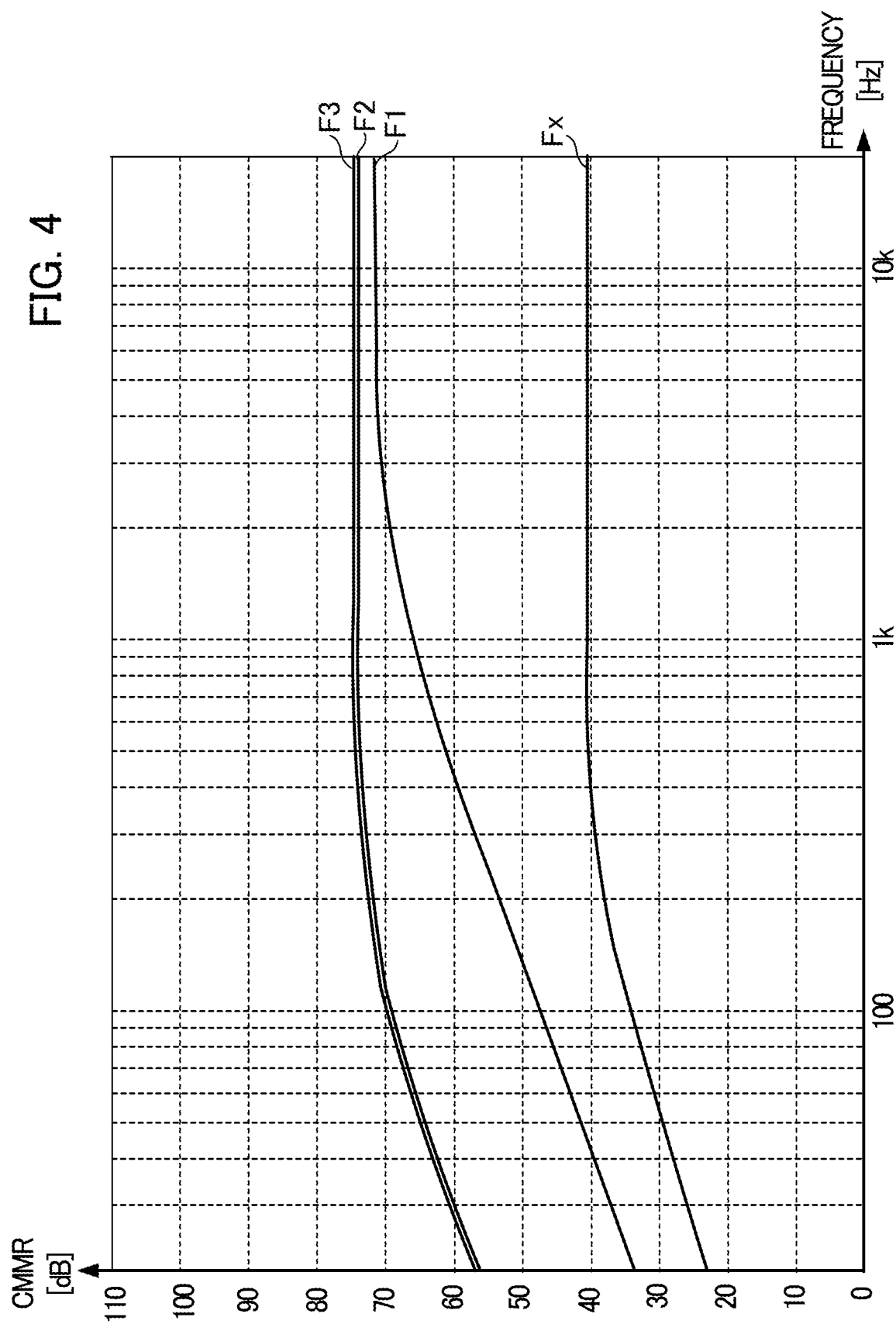
FIG. 4 is a graph illustrating the results of a simulation of CMRR.

Next, the results of the simulation of CMRR are illustrated in FIG. 4. In FIG. 4, the vertical axis represents CMRR in 20 Log (eo/ei) in a situation in which the magnitude of the AC potential difference Vn multiplexed on the input audio signal Vin is expressed as "ei," and the magnitude of the AC potential difference Vn multiplexed on the output audio signal Vout is expressed as "eo." Compared to a frequency characteristic Fx of the CMRR in the comparative example, a frequency characteristic F1 of the CMRR in the first embodiment is increased by approximately 30 dB in a high frequency band of 3 kHz or more.

In the first embodiment described above, the data signal transmitter 20A is provided in the transmitting apparatus 100, the data signal receiver 40A is provided in the receiving apparatus 200, and the data signal D is transmitted from the transmitting apparatus 100 to the receiving apparatus 200. However, in order to transmit the data signal D from the receiving apparatus 200 to the transmitting apparatus 100, the data signal transmitter 20A may be provided in the receiving apparatus 200, and the data signal receiver 40A may be provided in the transmitting apparatus 100.

Figure 5A:
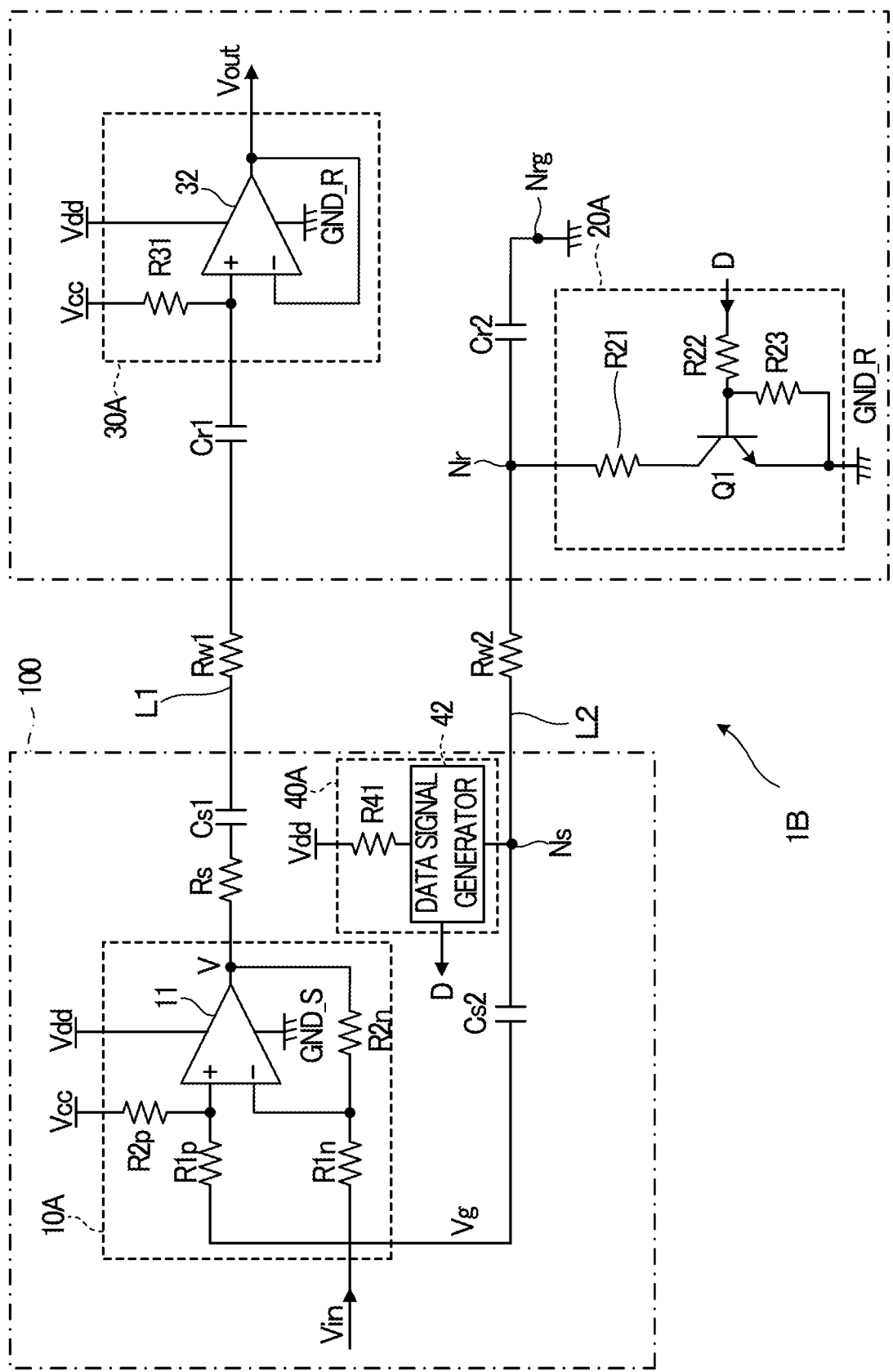
FIG. 5A is a circuit diagram illustrating a configuration of a signal transmitting system 1B according to a modification of the first embodiment.

FIG. 5A illustrates a circuit diagram of a signal transmitting system 1B according to a modification of the first embodiment. As illustrated in FIG. 5A, the data signal transmitter 20A is connected to the receiving-side node Nr, and the data signal receiver 40A is connected to the transmitting-side node Ns.

Figure 5B:
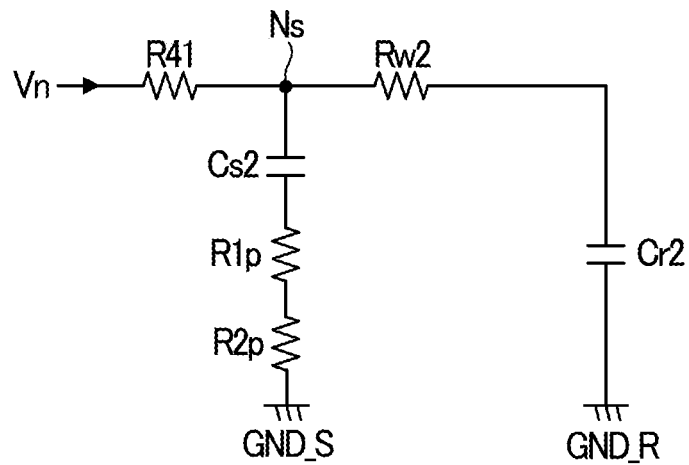
FIG. 5B is a circuit diagram illustrating an equivalent circuit with respect to the AC component when viewing a transmitting-side node Ns from one terminal of a resistance element R41 to which a power supply potential Vdd is applied when a logic level of a data signal D is low.

FIG. 5B illustrates an equivalent circuit with respect to the AC component when viewing the transmitting-side node Ns from one terminal of the resistance element R41 to which the power supply potential Vdd is applied in a situation in which the logic level of the data signal D is low. In FIG. 5B, the resistance value of the equivalent resistance Rw2 of the second line L2 is about 0.3 ohms, which is extremely small compared to the resistance value (for example, 4.7 k ohms) of the resistance element R41. Therefore, when the data signal D is at a low level and the transistor Q1 is in an OFF state, the noise voltage Vx is barely entered into the second line L2.

Figure 5C:
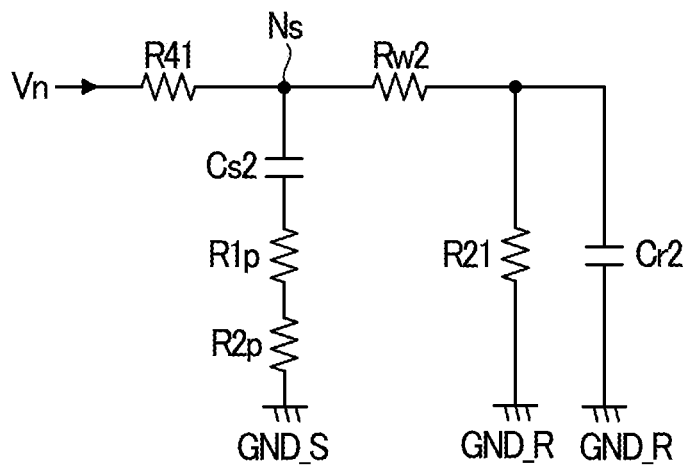
FIG. 5C is a circuit diagram illustrating an equivalent circuit with respect to the AC component when viewing the transmitting-side node Ns from one terminal of the resistance element R41 to which the power supply potential Vdd is applied when a logic level of the data signal D is high.
Figure 5D:
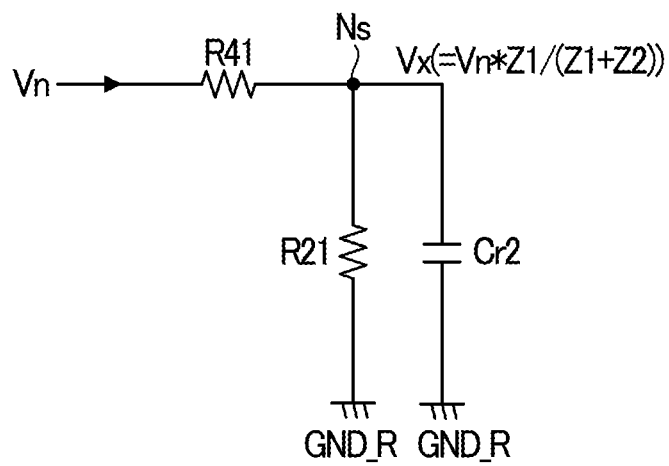
FIG. 5D is a circuit diagram illustrating an equivalent circuit with respect to the AC component when viewing the transmitting-side node Ns from one terminal of the resistance element R41 to which the power supply potential Vdd is applied.

FIG. 5C illustrates an equivalent circuit with respect to the AC component when viewing the transmitting-side node Ns from one terminal of the resistance element R41 to which the power supply potential Vdd is applied in a situation in which the logic level of the data signal D is high. In FIG. 5C, the resistance value of the equivalent resistance Rw2 is sufficiently small, and the resistance values of the resistance elements R1$p$ and R2$p$ are sufficiently large compared to the resistance value of the resistance element R41. Accordingly, the resistance element R1$p$, the resistance element R2$p$ and equivalent resistance Rw2 can be ignored. Therefore, a substantial equivalent circuit with respect to the AC component when viewing the transmitting-side node Ns from one terminal of the resistance element R41 to which the power supply potential Vdd is applied is as illustrated in FIG. 5D.

Here, it is assumed that the impedance of the second receiving-side capacitance element Cr2 is sufficiently large. It is also assumed that the first impedance Z1 is an impedance of the data signal transmitter 20A (resistance value of the resistance element R21) when viewed from the second line L2. In addition, it is assumed that the second impedance Z2 is an impedance of the data signal receiver 40A (resistance value of the resistance element R41) when viewed from the second line L2. In this case, the noise voltage Vx entered in the transmission node Ns is obtained by dividing the AC potential difference Vn by the second impedance Z2 and the first impedance Z1. That is, Vx=Vn*Z1/(Z1+Z2) is established.

In order to reduce the noise voltage Vx, it is preferable that the second impedance Z2 is larger than the first impedance Z1. For example, the resistance value of the resistance element R41 may be set to 4.7 k ohms, and the resistance value of the resistance element R21 may be set to 680 ohms. Further, increasing the capacitance value of the second receiving-side capacitance element Cr2 in order to lower the impedance of the second receiving-side capacitance element Cr2 is equivalent to lowering the resistance value of the resistance element R21 in accordance with a rise in the frequency of a signal that is input. Therefore, it is effective to reduce the entering of the noise voltage Vx in the audio band.

2. Second Embodiment

Figure 6:
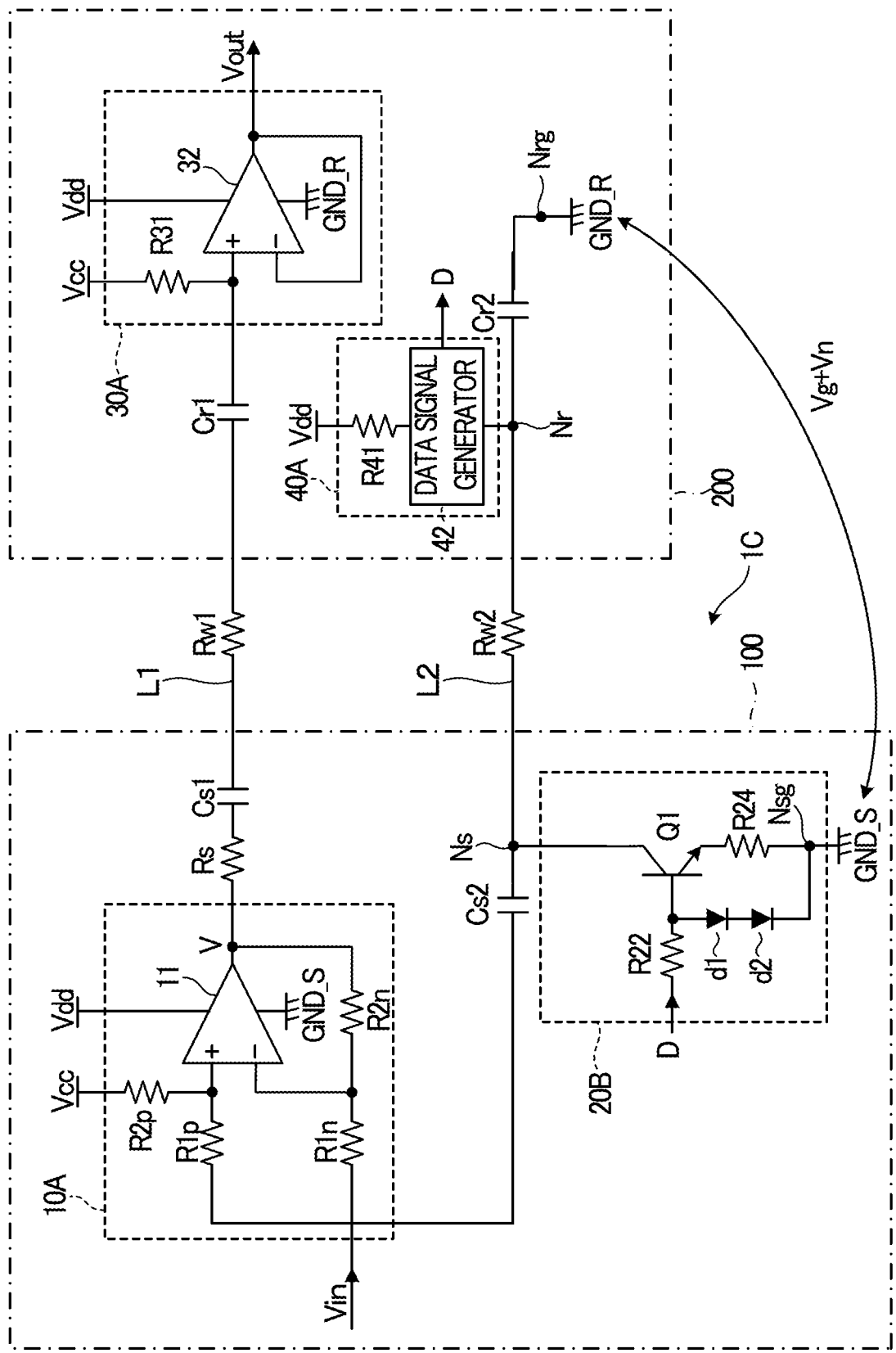
FIG. 6 is a circuit diagram illustrating a configuration of a signal transmitting system 1C according to a second embodiment.

Next, a signal transmitting system 1C according to a second embodiment will be described. FIG. 6 illustrates a circuit diagram of the signal transmitting system 1C according to the second embodiment. The signal transmitting system 1C is configured in the same manner as the signal transmitting system 1A according to the first embodiment described with reference to FIG. 1A, except that a data signal transmitter 20B is used instead of the data signal transmitter 20A.

The data signal transmitter 20B includes a diode d1 and a diode d2 that are connected in series between the base of the transistor Q1 and the transmitting-side ground node Nsg. One terminal of the resistance element R22 is connected to the base of the transistor Q1, and the other terminal of the resistance element R22 is supplied with the data signal D. Also, a resistance element R24 is provided between the emitter of the transistor Q1 and the transmitting-side ground node Nsg, and the transmitting-side node Ns is connected to the collector of the transistor Q1. When the logic level of the data signal D is high, the transistor Q1 is turned on. In this case, a constant current flows from the transmitting-side node Ns to the transmitting-side ground node Nsg. On the other hand, when the logic level of the data signal D is low, the transistor Q1 is turned off. In this case, no current flows from the transmitting-side node Ns to the transmitting-side ground node Nsg. As a result, the magnitude of the direct current flowing via the second line L2 can be controlled in accordance with the logic level of the data signal D.

A constant current circuit is employed in the data signal transmitter 20B. Therefore, an impedance of the data signal transmitter 20B when viewed from the second line L2 is higher than the first impedance Z1 of the data signal transmitter 20A when viewed from the second line L2 in the signal transmitting system 1A according the first embodiment. Thus, the signal transmitting system 1C can improve the CMRR in comparison with the signal transmitting system 1A. In particular, the impedance of the data signal transmitter 20B when viewed from the second line L2 can be higher than the impedance of the second receiving-side capacitance element Cr2 at the low frequency band. Therefore, the CMRR at the low frequency band can be improved.

As illustrated in FIG. 4, a frequency characteristic F2 of the CMRR in the second embodiment is improved in comparison with the frequency characteristic F1 of the CMRR in the first embodiment. Specifically, the CMRR is higher by approximately 21 dB at the frequency band equal to or lower than 100 Hz.

3. Third Embodiment

In the second embodiment described above, the data signal transmitter 20B, including the constant current circuit, and the data signal receiver 40A are connected to the second line L2. However, in a third embodiment, the data signal transmitter 20B and the data signal receiver 40A are connected to the first line L1 in order to transmit the data signal D from the transmitting apparatus 100 to the receiving apparatus 200.

Figure 2:
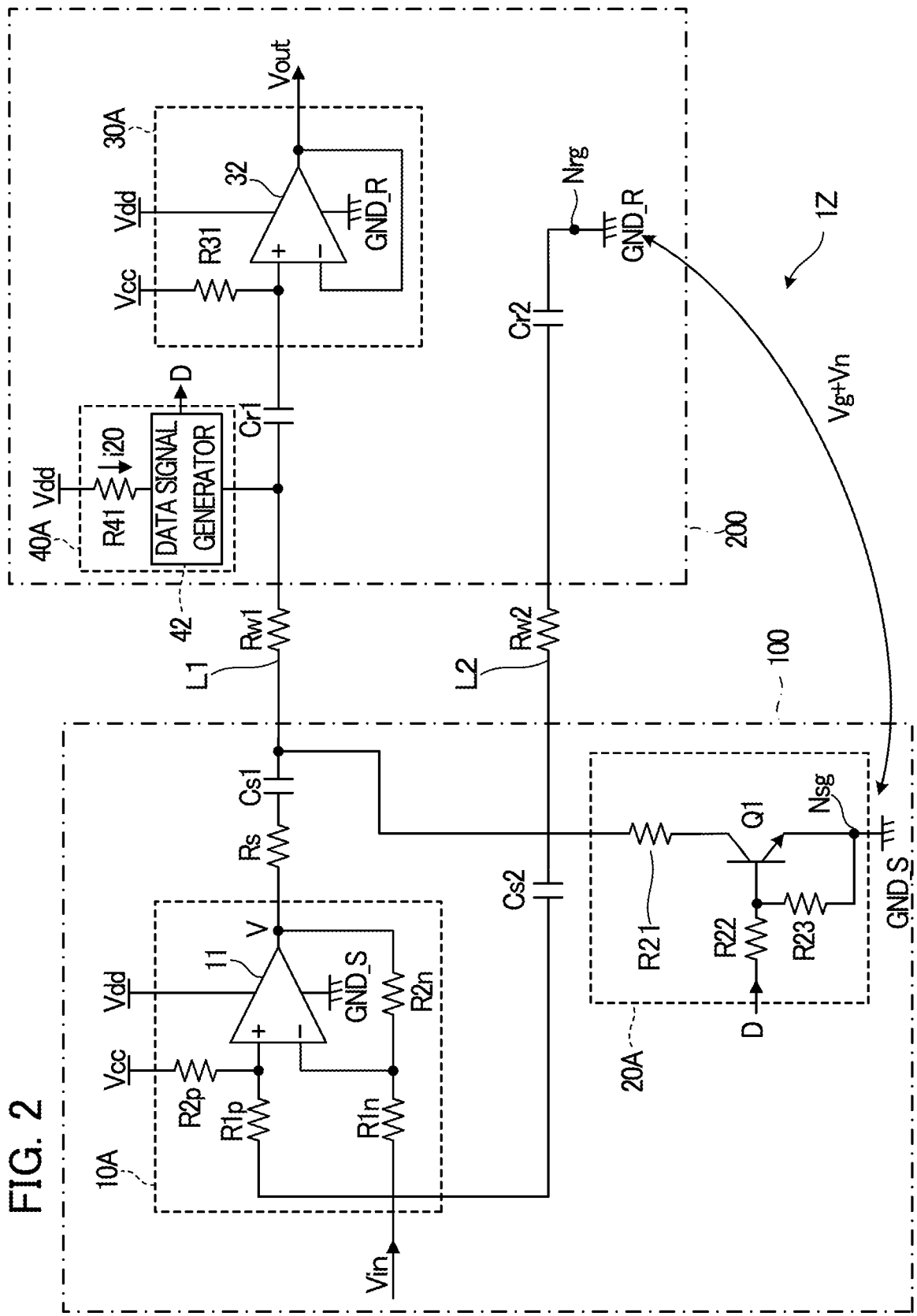
FIG. 2 is a circuit diagram of a signal transmitting system 1Z according to a comparative example.
Figure 7:
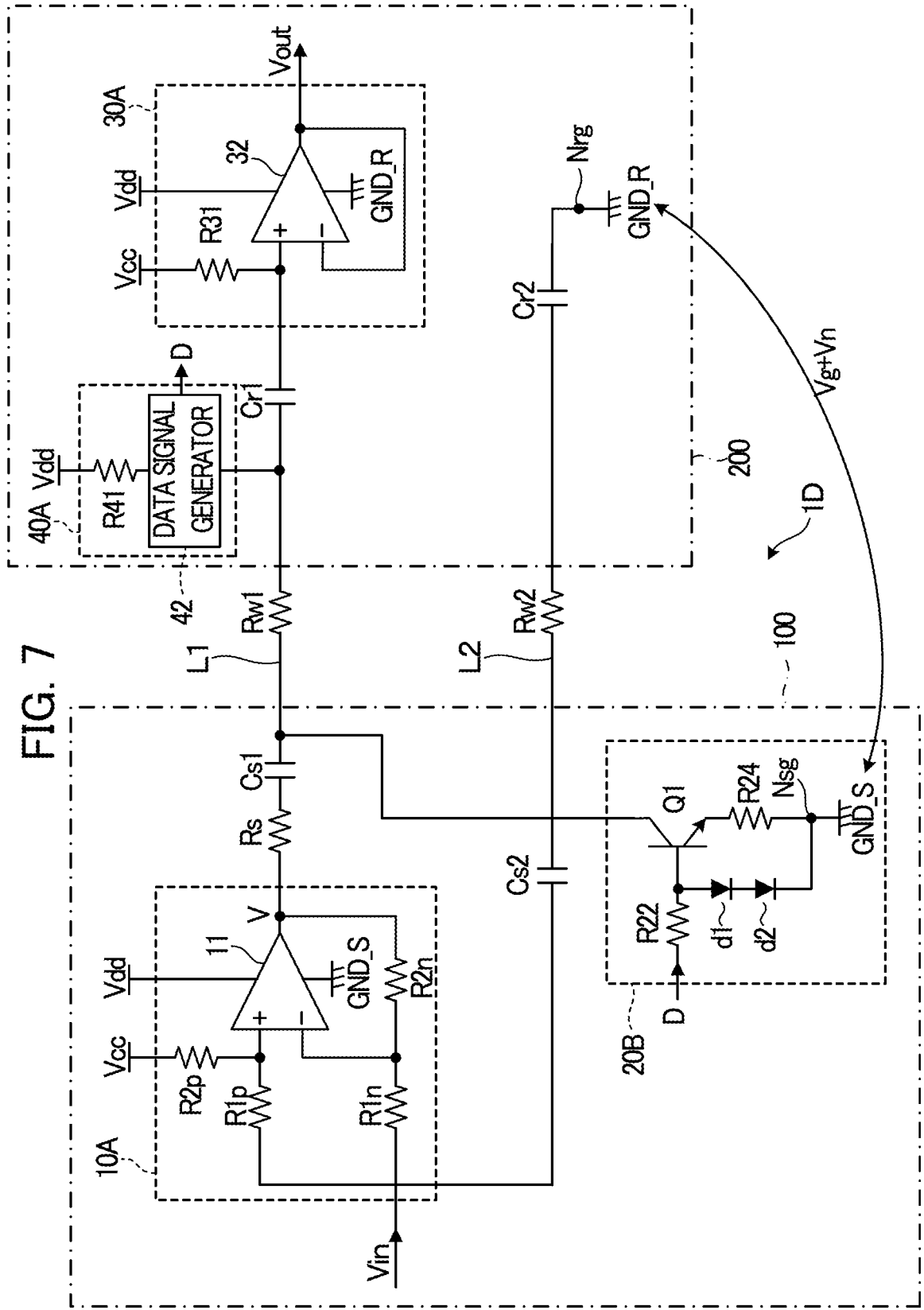
FIG. 7 is a circuit diagram illustrating a configuration of a signal transmitting system 1D according to a third embodiment.

FIG. 7 illustrates a circuit diagram of a signal transmitting system 1D according to the third embodiment. As illustrated in FIG. 7, the data signal transmitter 20B having the constant current circuit is connected to the first line L1. In the signal transmitting system 1Z according to the comparative example illustrated in FIG. 2, an impedance of the data signal transmitter 20A when viewed from the first line L1 is determined by the resistance value of the resistance element R21. In a situation in which the data signal D is transmitted using the direct current flowing in the first line L1, in order that the data signal receiver 40A in the receiving apparatus 200 can determine the logical level of the data signal D, it is preferable to cause a direct current of about 1 mA to flow in the first line L1 when the logic level of the data signal D is high. For this reason, an amount by which the resistance value of the resistance element R21 can be increased is limited.

The AC potential difference Vn is divided by the resistance element Rs and the impedance of the data signal transmitter 20B when viewed from the first line L1, and the divided AC potential Vn is entered into the first line L1. In the signal transmitting system 1D, the data signal transmitter 20B includes the constant current circuit. Accordingly, the impedance of the data signal transmitter 20B when viewed from the first line L1 can be increased. Therefore, the signal transmitting system 1D can increase the CMRR more in comparison with the signal transmitting system 1Z.

A frequency characteristic F3 of the CMRR in the third embodiment is improved from the frequency characteristic F1 of the CMRR in the first embodiment, and is substantially the same as that of the CMRR in the second embodiment. Similarly to the signal transmitting system 1Z, the current flowing via the resistance element R41 is modulated by the audio signal V.

4. Fourth Embodiment

In the first to third embodiments described above, the audio signal V is generated by canceling the AC potential difference Vn from the input audio signal Vin in the audio signal outputter 10A. On the other hand, in a signal transmitting system 1E according to a fourth embodiment, the receiving apparatus 200 generates the audio signal V by canceling the AC potential difference Vn.

Figure 8A:
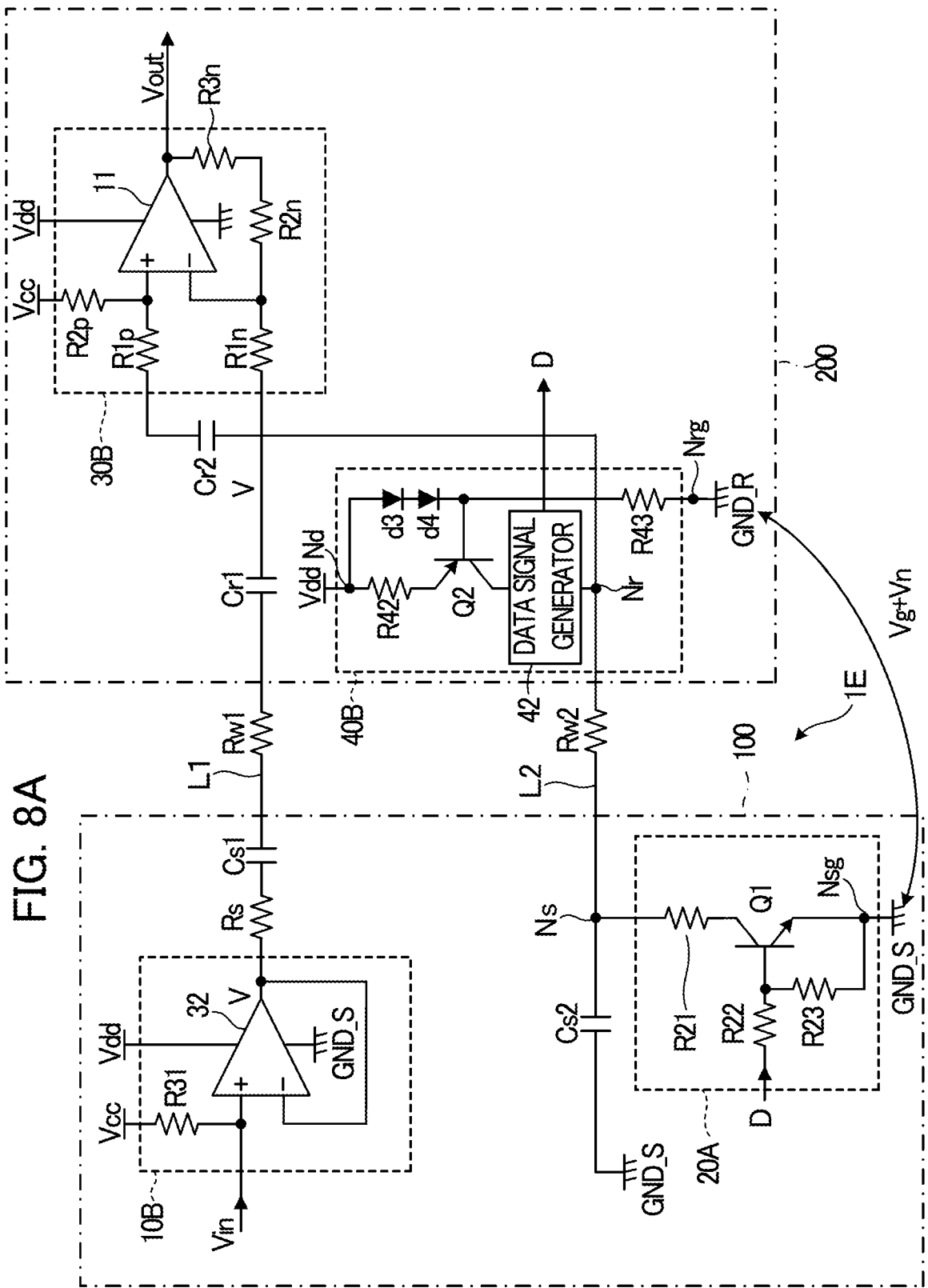
FIG. 8A is a circuit diagram illustrating a configuration of a signal transmitting system 1E according to a fourth embodiment.

FIG. 8A illustrates a circuit diagram of the signal transmitting system 1E according to the fourth embodiment. The signal transmitting system 1E is configured in the same manner as the signal transmitting system 1A in the first embodiment except that an audio signal outputter 10B (first signal outputter) is used instead of the audio signal outputter 10A in the transmitting apparatus 100, that an audio signal inputter 30B is used instead of the audio signal inputter 30A in the receiving apparatus 200, and that a data signal receiver 40B is used instead of the data signal receiver 40A in the receiving apparatus 200. The audio signal outputter 10B is, for example, audio signal output circuitry. The audio signal inputter 30B is, for example, audio signal input circuitry.

The audio signal outputter 10B is configured in the same manner as the audio signal inputter 30A. The audio signal inputter 30B is configured in the same manner as the audio signal outputter 10A except that a resistance element R3n is added between the output terminal of the operational amplifier 11 and the negative input terminal of the operational amplifier 11. The resistance value of the resistance element R3n is equal to the resistance value of a combined resistance that is formed by the resistance element Rs and the equivalent resistance Rw1. Further, the resistance value of a combined resistance that is formed by the resistance element R3n and the resistance element R2n is equal to the resistance value of a combined resistance that is formed by the resistance element Rs, the equivalent resistance Rw1, and the resistance element R1n. As a result, the gain of the inversion amplification that is carried out by the audio signal inputter 30B can be set to "1."

The data signal receiver 40B is connected to the second line L2, which connects the transmitting-side ground node Nsg and the audio signal inputter 30B with an AC connection. The data signal receiver 40B is provided with a constant current circuit configured to cause a constant current to flow in the second line L2 when the logic level of the data signal D is high. Specifically, the data signal receiver 40B includes a PNP-type transistor Q2, a resistance element R42, a resistance element R43, a diode d3 and a diode d4, and a data signal generator 42. One terminal of the resistance element R42 is connected to the emitter of the transistor Q2, and the other terminal of the resistance element R42 is connected to the power supply node Nd to which the power supply potential Vdd is applied. The diode d3 and the diode d4 are connected in series between the power supply node Nd and the base of the transistor Q2. The resistance element R43 is provided between the base of the transistor Q2 and the receiving-side ground node Nrg. Further, the data signal generator 42 is provided between the collector of the transistor Q2 and the receiving-side node Nr.

In the data signal receiver 40B, the constant current circuit is formed by elements other than the data signal generator 42. The data signal generator 42 detects the magnitude of the direct current flowing from the collector of the transistor Q2 via the receiving-side node Nr toward the second line L2, and compares the detected result with a threshold value. The data signal generator 42 generates the data signal D based on the comparison result.

In the above configuration, the audio signal outputter 10B in the transmitting apparatus 100 acts as a buffer. The audio signal outputter 10B outputs the audio signal V, in which the AC potential difference Vn is multiplexed, to the first line L1 via the resistance element Rs and the first transmitting-side capacitance element Cs1.

On the other hand, the audio signal V is input to the audio signal inputter 30B in the receiving apparatus 200 via the first line L1, and the transmitting-side ground potential GND_S is applied via the second line L2 to the audio signal inputter 30B. The AC potential difference Vn, which is divided by the resistance element R2p and the resistance element R1p, is applied to the positive input terminal of the operational amplifier 11. The AC potential difference Vn is multiplexed on the audio signal V as described above. However, the AC potential difference Vn is canceled from the audio signal V by the differential amplification circuit constituting the audio signal inputter 30B, and the output audio signal Vout is generated by the audio signal inputter 30B. As a result, the CMRR can be increased.

In addition, in the fourth embodiment, when the logic level of the data signal D is high, the transistor Q1 is turned on. In this case, the AC potential difference Vn enters into the second line L2 in the same manner as in the first embodiment. It is also assumed that the first impedance Z1 is an impedance of the data signal transmitter 20A (resistance value of the resistance element R21) when viewed from the second line L2. In addition, it is assumed that the second impedance Z2 is an impedance of the data signal receiver 40B (impedance of the constant current circuit) when viewed from the second line L2. When the noise voltage Vx entered into the transmission node Ns is expressed by using the first impedance Z1 and the second impedance Z2, the noise voltage Vx is obtained by dividing the AC potential difference Vn by the first impedance Z1 and the second impedance Z2, and $Vx=Vn*Z1/(Z1+Z2)$ is established.

Therefore, in order to reduce the noise voltage Vx to be entered in the signal transmitting system 1E in which a configuration for cancelling the AC potential difference Vn (audio signal inputter 30B in this example) is provided in the receiving apparatus 200, the second impedance Z2 is preferably larger than the first impedance Z1. Further, increasing the capacitance value of the second transmitting-side capacitance element Cs2 in order to lower an impedance of the second transmitting-side capacitance element Cs2 is equivalent to lowering the resistance value of the resistance element R21 in accordance with a rise in the frequency of a signal that is input. Therefore, it is effective to reduce the entering of the noise voltage Vx in the audio band.

In the fourth embodiment described above, the data signal transmitter 20A is provided in the transmitting apparatus 100, the data signal receiver 40B is provided in the receiving apparatus 200, and the data signal D is transmitted from the transmitting apparatus 100 to the receiving apparatus 200. However, the data signal D may be transmitted from the receiving apparatus 200 to the transmitting apparatus 100.

Figure 8B:
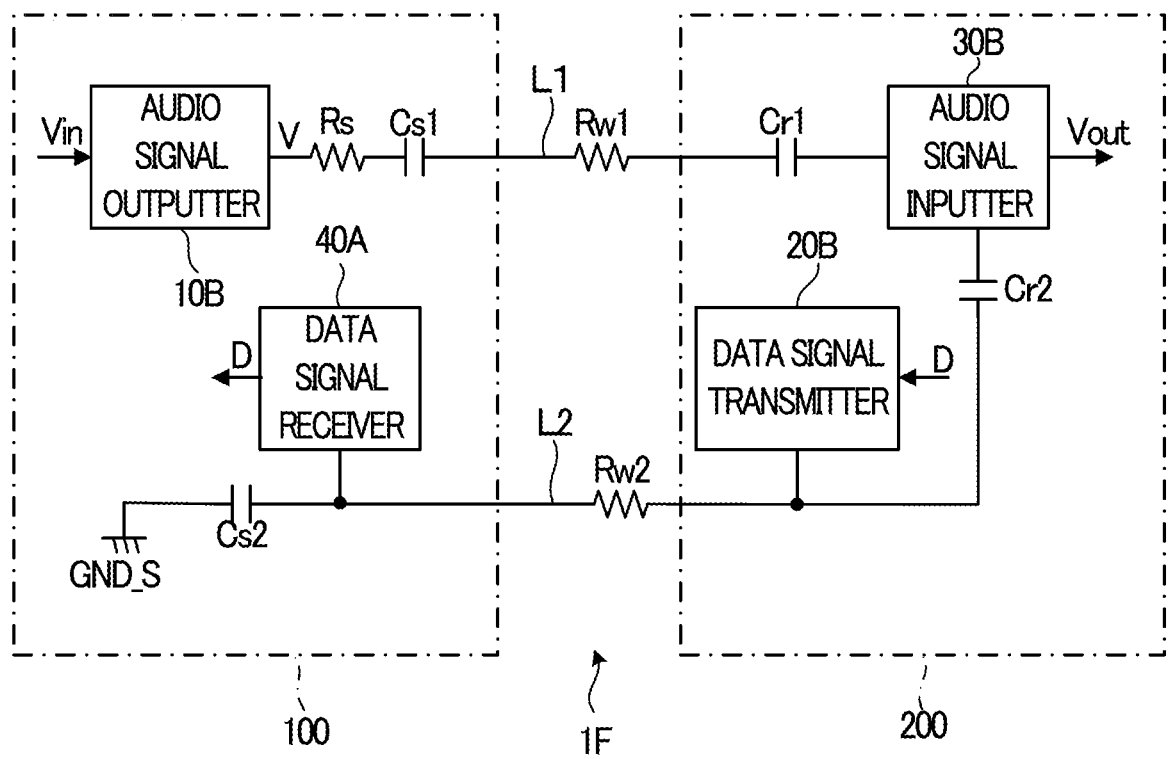
FIG. 8B is a block diagram illustrating a configuration of a signal transmitting system 1F according to a modification of the fourth embodiment.

FIG. 8B illustrates a block diagram of a signal transmitting system 1F according to a first modification of the fourth embodiment. The signal transmitting system 1F is configured in the same manner as the signal transmitting system 1E except that the data signal receiver 40A described in the first embodiment (specifically, see FIG. 1) is used instead of the data signal transmitter 20A in the transmitting apparatus 100, and that the data signal transmitter 20B (refer to FIG. 6) described in the second embodiment is used instead of the data signal receiver 40B in the receiving apparatus 200.

Since the data signal transmitter 20B has the constant current circuit, an impedance of the data signal transmitter 20B when viewed from the second line L2 is large. In the signal transmitting system 1F, the impedance of the data signal transmitter 20B (second communicator) when viewed from the second line L2 is higher than an impedance of the data signal receiver 40A (first communicator) when viewed from the second line L2. Therefore, when the logic level of the data signal D is high, the noise voltage entered into the second line L2 via the data signal receiver 40A can be reduced.

In the fourth embodiment described above, the data signal D is transmitted using the second line L2, but the data signal D may be transmitted from the receiving apparatus 200 to the transmitting apparatus 100 by using the first line L1.

Figure 8C:
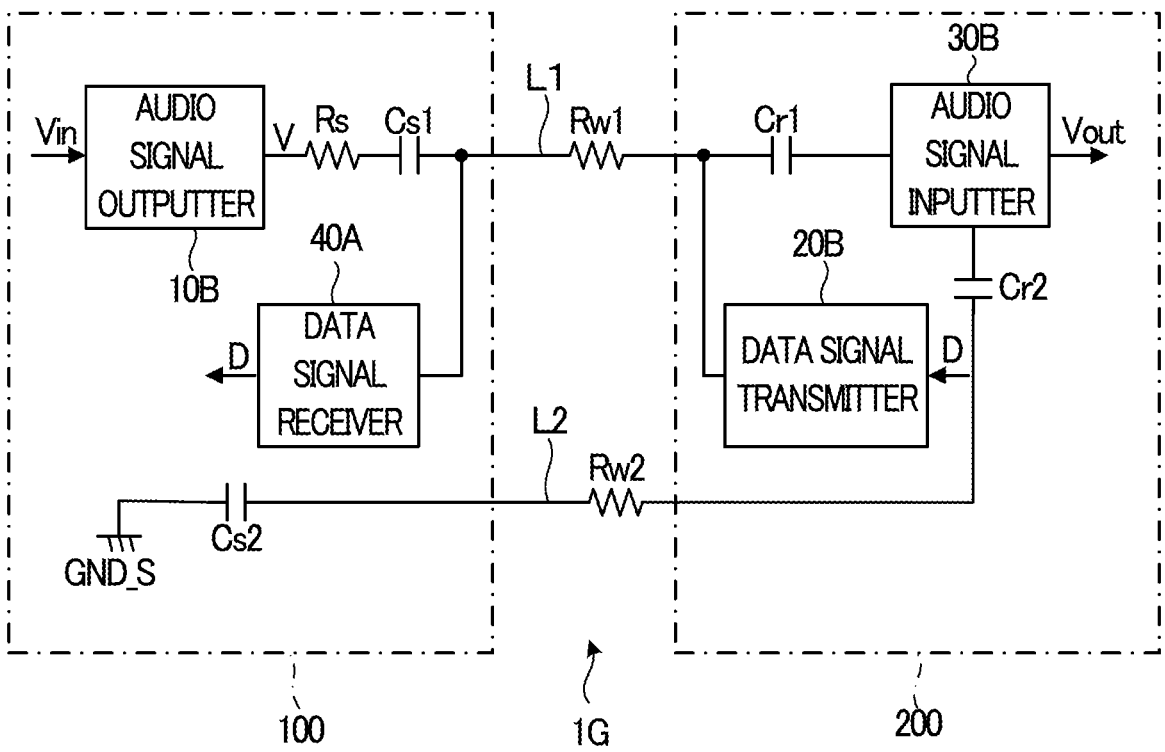
FIG. 8C is a block diagram illustrating a configuration of a signal transmitting system 1G according to a modification of the fourth embodiment.

FIG. 8C illustrates a block diagram of a signal transmitting system 1G according to a second modification of the fourth embodiment. The signal transmitting system 1G is configured similarly to the signal transmitting system 1F except that the data signal receiver 40A is connected to the first line L1 instead of the second line L2 in the transmitting apparatus 100, and that the data signal transmitter 20B is connected to the first line L1 instead of the second line L2 in the receiving apparatus 200.

In the signal transmitting system 1G, an impedance of the data signal transmitter 20B (second communicator) when viewed from the first line L1 is higher than an impedance of the data signal receiver 40A (first communicator) when viewed from the first line L1. Therefore, when the logic level of the data signal D is high, the noise voltage entered into the first line L1 via the data signal receiver 40A can be reduced.

Figure 8D:
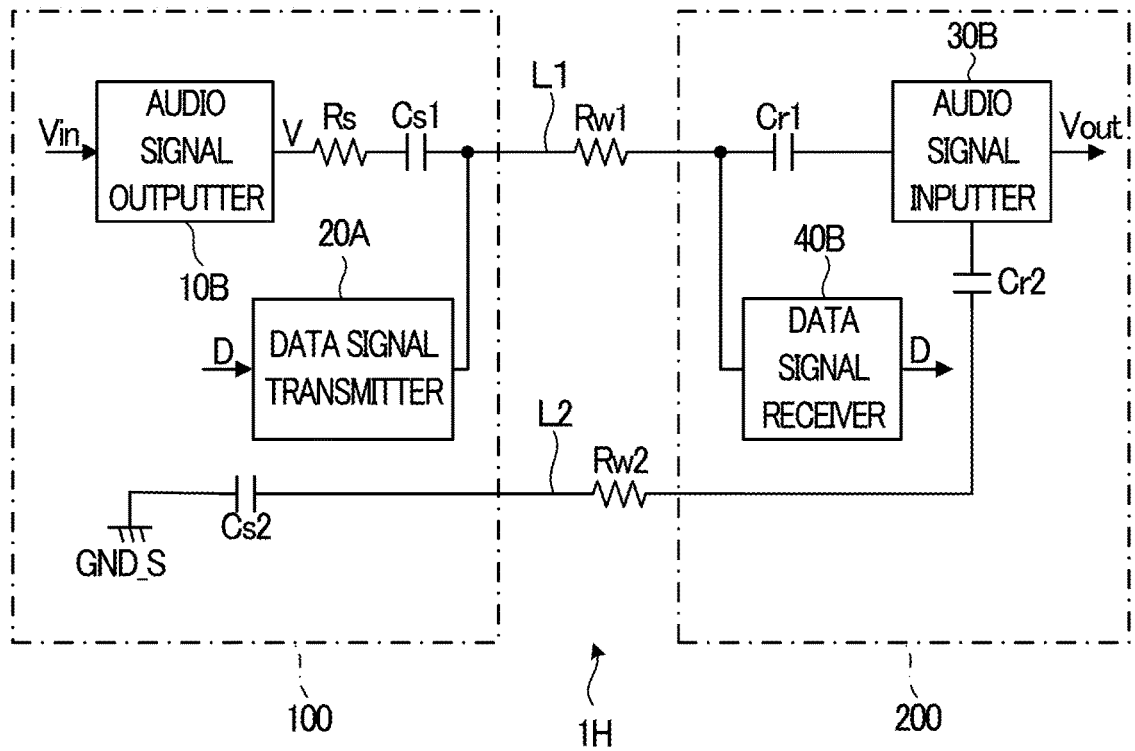
FIG. 8D is a block diagram illustrating a configuration of a signal transmitting system 1H according to a modification of the fourth embodiment.

In the signal transmitting system 1G, the data signal D is transmitted from the receiving apparatus 200 to the transmitting apparatus 100, but the data signal D may also be transmitted from the transmitting apparatus 100 to the receiving apparatus 200. FIG. 8D illustrates a block diagram of a signal transmitting system 1H according to a third modification of the fourth embodiment. The signal transmitting system 1H is configured in the same manner as the signal transmitting system 1G except that the data signal transmitter 20A is used instead of the data signal receiver 40A and that the data signal receiver 40B is used instead of the data signal transmitter 20B. In the signal transmitting system 1H, an impedance of the data signal receiver 40B (second communicator) when viewed from the first line L1 is higher than an impedance of the data signal transmitter 20A (first communicator) when viewed from the first line L1. Therefore, when the logic level of the data signal D is high, the noise voltage entered into the first line L1 via the data signal transmitter 20A can be reduced.

5. Modifications

This disclosure is not limited to the embodiments described above, and various modifications, which will be described below, are possible. Further, each of the modifications and the embodiments may be combined with each other as appropriate.

(1) In the first embodiment, the modification of the first embodiment, the second embodiment, and the third embodiment, the input audio signal Vin is input to the audio signal outputter 10A. Here, the frequency characteristic of an output impedance of a buffer circuit that supplies the input audio signal Vin to the audio signal outputter 10A may be low at the high frequency band. In such a case, in order not to reduce the CMRR, it is preferable to provide an element, having the same frequency characteristic as the frequency characteristic of the buffer circuit, for the input side of the AC potential difference Vn.

Figure 9:
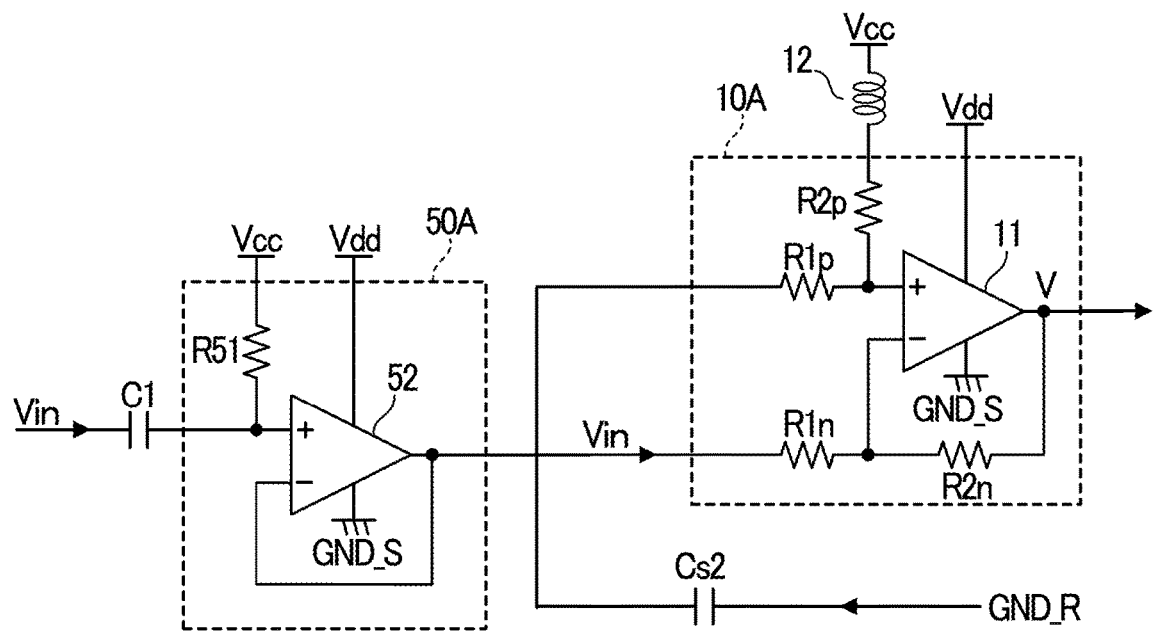
FIG. 9 is a circuit diagram illustrating a peripheral configuration of an audio signal outputter 10A according to a modification.

FIG. 9 is a circuit diagram illustrating a peripheral configuration of the audio signal outputter 10A according to a modification. In this example, a buffer circuit 50A supplies the input audio signal Vin to the audio signal outputter 10A with low impedance. In the buffer circuit 50A, an output terminal and a negative input terminal of an operational amplifier 52 are connected to each other, and a positive input terminal of the operational amplifier 52 is biased to the bias potential Vcc via a resistance element R51. The operational amplifier 52 acts as a voltage follower. However, when the frequency characteristic of the gain of the operational amplifier 52 is lowered at a high frequency band, an output impedance of the buffer circuit 50A is increased at the high frequency band.

Even if an impedance of a receiving side that receives the AC potential difference Vn in the audio signal outputter 10A coincides with an output impedance of the buffer circuit 50A at the low frequency band, the CMRR in the high frequency band is lowered when these impedances are mismatched with each other at the high frequency band. Therefore, in the modification, an inductor 12 is added to the positive input terminal side of the operational amplifier 11 to which the AC potential difference Vn is input. Specifically, the bias potential Vcc is supplied to the resistance element R2p via the inductor 12. When the frequency of a signal that is input to the inductor 12 becomes high, an impedance of the inductor 12 becomes high. Therefore, by adjusting the inductance value of the inductor 12, it is possible to improve the CMRR in the high frequency band.

In the following description a condition for canceling the AC potential difference Vn with high accuracy is more generally considered. Focusing on the operational amplifier 11 of the audio signal outputter 10A, where an impedance of a side of the second line (second line side) when viewed from the positive input terminal of the operational amplifier 11 is Z1p, an impedance of a supply side that supplies the bias potential Vcc when viewed from the positive input terminal of the operational amplifier 11 is Z2p, an impedance of a supply side that supplies the input audio signal Vin when viewed from the negative input terminal of the operational amplifier 11 is Z1n, and an impedance of the output terminal of the operational amplifier 11 when viewed from the negative input terminal of the operational amplifier 11 is Z2n, the AC potential difference Vn can be canceled with high accuracy when Z2p/Z1p and Z2n/Z1n are approximately equal to each other.

In addition, in the fourth embodiment and the modification of the fourth embodiment, the frequency characteristic of an output impedance of the audio signal outputter 10B, which acts as a buffer circuit, may be reduced at a high frequency band. In such a case, in order not to reduce the CMRR, it is preferable to provide an element, having the same frequency characteristic as the buffer circuit, for the side that receives the AC potential difference Vn in the audio signal output part 30B.

Specifically, in FIG. 8A, the inductor 12 may be added to the positive input terminal side of the operational amplifier 11, and the bias potential Vcc may be supplied to the resistance element R2p via the inductor 12. When the gain of the operational amplifier 32 in the audio signal outputter 10B is reduced at the high frequency band, the output impedance of the audio signal outputter 10B is increased at the high frequency band.

When the frequency of a signal that is input to the inductor 12 is high, the impedance of the inductor 12 is high. Therefore, by adjusting the inductance value of the inductor 12, it is possible to improve the CMRR in the high frequency band.

Focusing on the operational amplifier 11 of the audio signal inputter 30B in the same way as the operational amplifier 11 in the audio signal outputter 10A, where an impedance of a side of the second line when viewed from the positive input terminal of the operational amplifier 11 is Z1p, an impedance of a supply side that supplies the bias potential Vcc when viewed from the positive input terminal of the operational amplifier 11 is Z2p, an impedance of a supply side that supplied the audio signal V when viewed from the negative input terminal of the operational amplifier 11 is Z1n, and an impedance of the output terminal of the operational amplifier 11 when viewed from the negative input terminal of the operational amplifier 11 is Z2n, the AC potential difference Vn can be canceled with high accuracy when Z2p/Z1p and Z2n/Z1n are approximately equal to each other.

(2) In the first embodiment, the modification of the first embodiment, the second embodiment, and the third embodiment, the input audio signal Vin is single-ended, but the input audio signal Vin may be in a differential form.

Figure 10A:
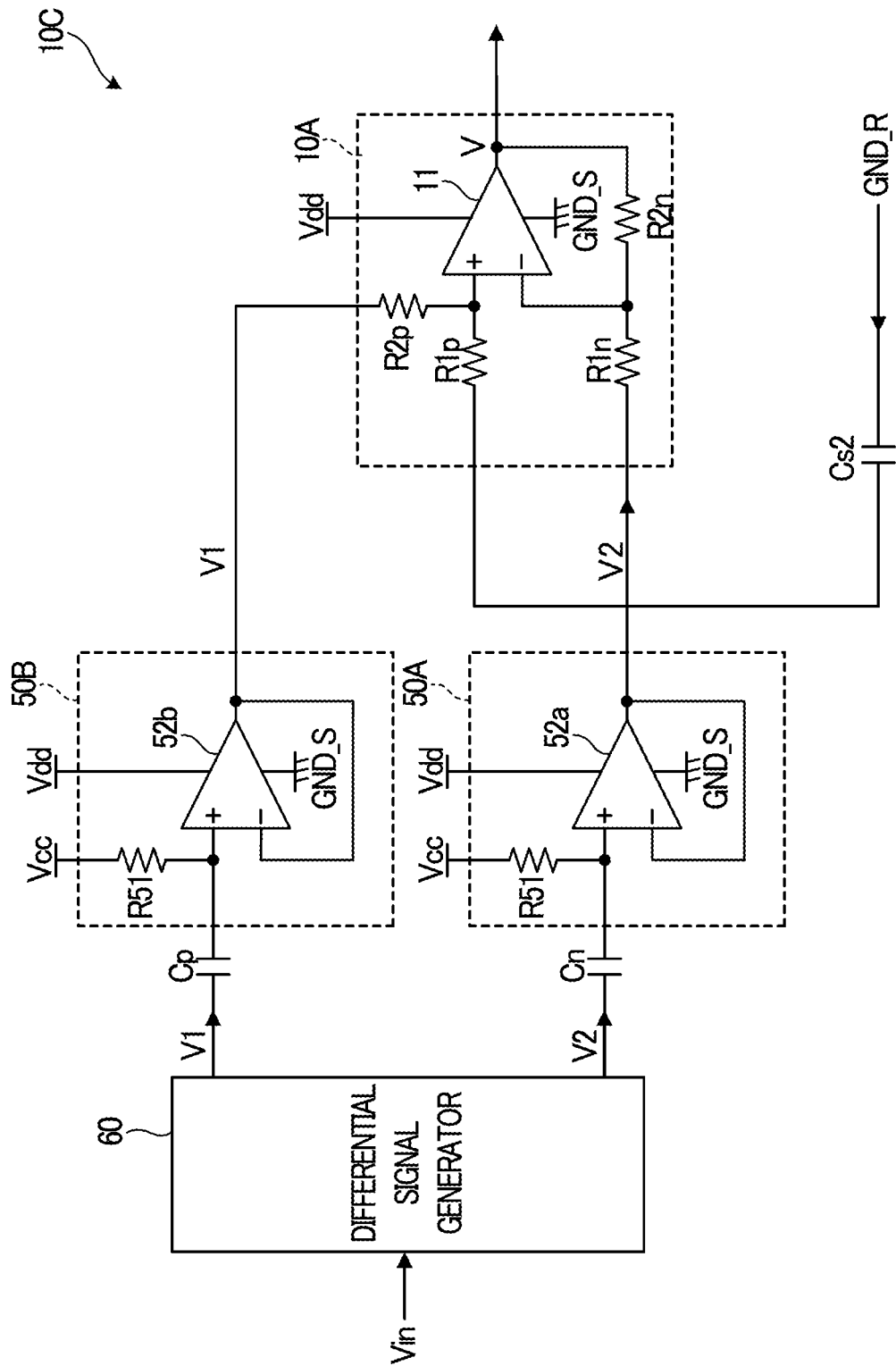
FIG. 10A is a circuit diagram illustrating a configuration of an audio signal outputter 10C according to a modification.

FIG. 10A is a circuit diagram illustrating a peripheral configuration of an audio signal outputter 10C according to a modification. The audio signal outputter is, for example, audio signal output circuitry. The audio signal outputter 10C (first signal outputter) includes the buffer circuit 50A, a buffer circuit 50B, a differential signal generator 60, and the audio signal outputter 10A. Based on the input audio signal Vin, the differential signal generator 60 generates a positive-phase signal V1 and an inverted-phase signal V2, which is obtained by inverting the positive-phase signal V1. The positive-phase signal V1 is input to the buffer circuit 50B via a capacitance element Cp, and the inverted-phase signal V2 is input to the buffer circuit 50A via a capacitance element Cn.

The configuration of the buffer circuit 50B is the same as the configuration of the buffer circuit 50A. Therefore, the frequency characteristic of an output impedance of the buffer circuit 50B and the frequency characteristic of an output impedance of the buffer circuit 50A are slightly different from each other due to variations in the resistance value of the element, the capacitance value of the element, and the like, but are substantially equal to each other. For example, the frequency characteristic of the output impedance of the buffer circuit 50B and the frequency characteristic of the output impedance of the buffer circuit 50A are substantially equal to each other in a case where the rate of the variations in the resistance values of the elements is 0.1 percent.

Here, it is preferable that the operational amplifier 52a in the buffer circuit 50A and the operational amplifier 52b in the buffer circuit 50B are obtained from the same wafer, in order to match the frequency characteristics of the buffer circuit 50A with the frequency characteristics of the buffer circuit 50B. The positive-phase signal V1, which is output from the buffer circuit 50B, is supplied to the positive input terminal of the operational amplifier 11 via the resistance element R2p, and the inverted-phase signal V2, which is output from the buffer circuit 50A, is supplied to the negative input terminal of the operational amplifier 11 via the resistance element R1n. The receiving-side ground potential GND_R is supplied to the positive input terminal of the operational amplifier 11 via the resistance element R1p. The AC potential difference Vn is multiplexed on the positive-phase signal V1 and the inverted-phase signal V2 as in-phase noise.

The frequency characteristic of an impedance of a supply side that supplies the positive-phase signal V1 when viewed from the positive input terminal of the operational amplifier 11 to which the positive-phase signal V1 is supplied is substantially equal to the frequency characteristic of an impedance of a supply side that the inverted-phase signal V2 when viewed from the negative input terminal of the operational amplifier 11 to which the inverted-phase signal V2 is supplied. As a result, even if the frequency characteristics of the gains of the operational amplifier 52a and the operational amplifier 52*b* are reduced in a high frequency band, it is possible to suppress a reduction in the CMRR at the high frequency.

Note that it is also possible that the positive-phase signal V1 is supplied to the negative input terminal of the operational amplifier 11 via the resistance element R1*n*, and that the inverted-phase signal V2 is supplied to the positive input terminal of the operational amplifier 11 via the resistance element R2*p*.

In addition, in the fourth embodiment and the modification of the fourth embodiment, the audio signal V which is supplied to the audio signal inputter 30B is single-ended, but the audio signal V may be supplied to the audio signal inputter 30B in the differential form.

Figure 10B:
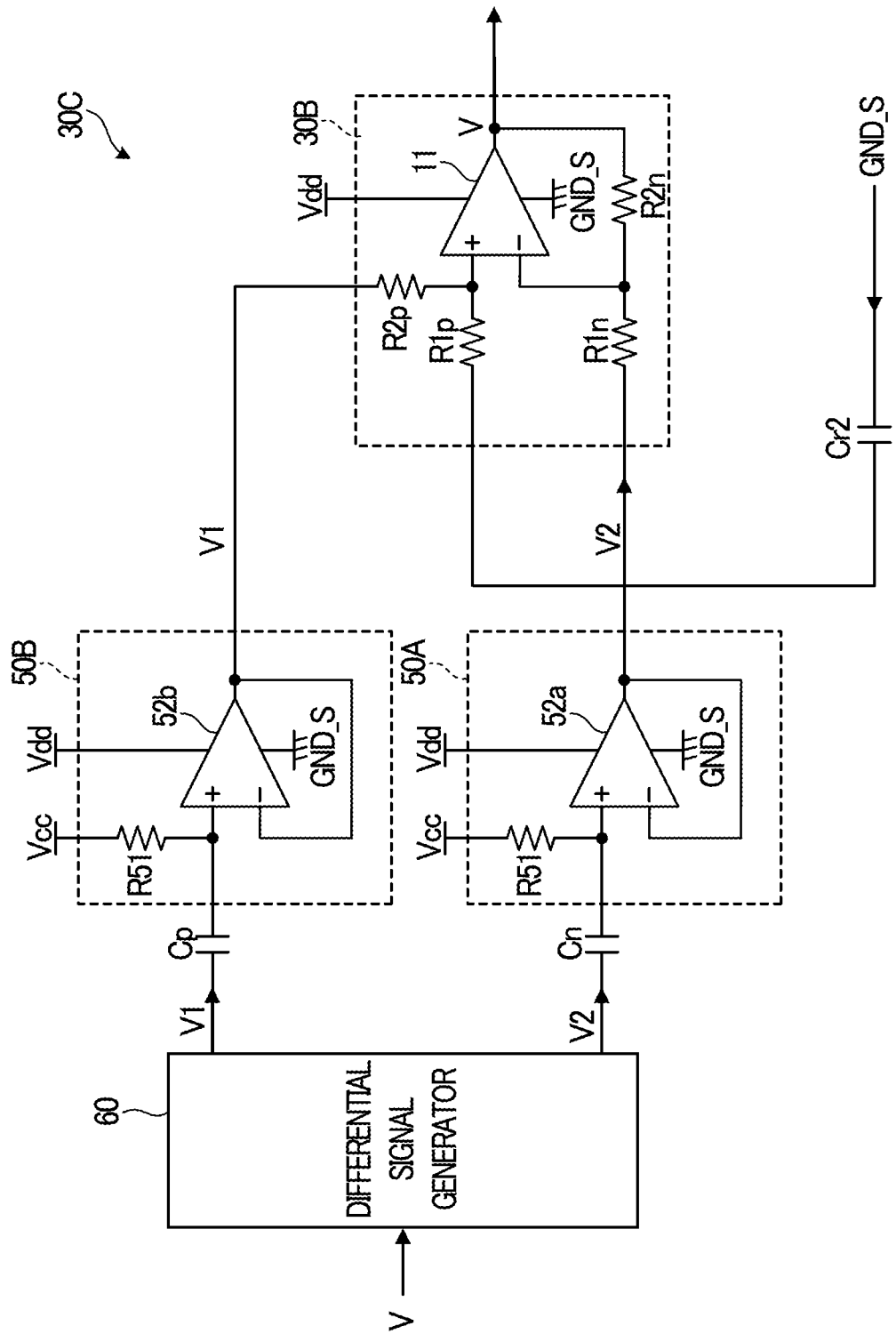
FIG. 10B is a circuit diagram illustrating a configuration of an audio signal inputter 30C according to a modification.

FIG. 10B is a circuit diagram illustrating a peripheral configuration of an audio signal inputter 30C according to a modification. The audio signal inputter 30C is, for example, audio signal input circuitry. The audio signal inputter 30C includes the buffer circuit 50A, the buffer circuit 50B, the differential signal generator 60, and the audio signal inputter 30B. Similarly to the audio signal outputter 10C described with reference to FIG. 10A, the audio signal inputter 30C can suppress a reduction in CMRR at the high frequency band even if the frequency characteristics of the gains of the operational amplifier 52*a* and the operational amplifier 52*b* are reduced in the high frequency band.

(3) In the modification described with reference to FIG. 10A, the input audio signal Vin is supplied to the audio signal outputter 10A from the buffer circuit 50B and the buffer circuit 50A in the differential form, but the buffer circuit 50B may output the bias potential Vcc and the buffer circuit 50A may output the single-ended input audio signal Vin.

Figure 11A:
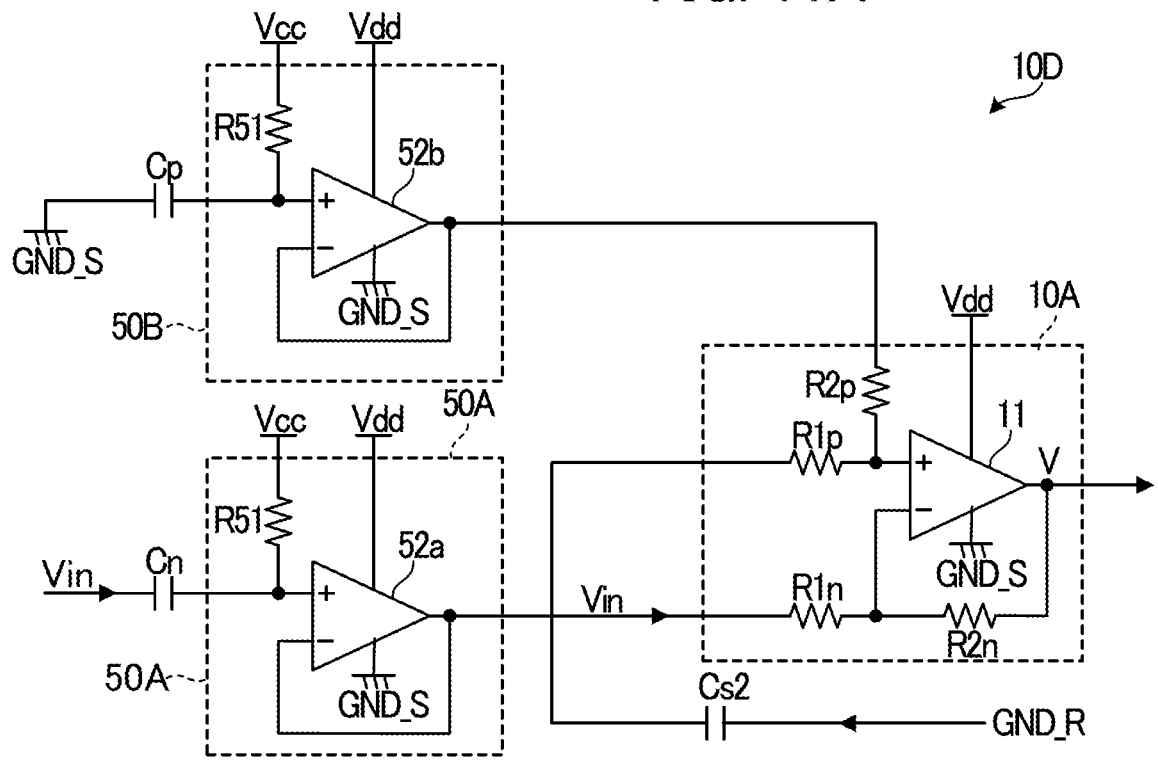
FIG. 11A is a circuit diagram illustrating a configuration of an audio signal outputter 10D according to a modification.

FIG. 11A is a circuit diagram illustrating a configuration of an audio signal outputter 10D according to a modification. The audio signal outputter 10D is, for example, audio signal output circuitry.

In the audio signal outputter 10D (first signal outputter), the positive input terminal of the operational amplifier 52*b* in the buffer circuit 50B is biased to the bias potential Vcc via the resistance element R51. Therefore, the buffer circuit 50B outputs the bias potential Vcc.

The frequency characteristics of the output impedance of the buffer circuit 50B are substantially equal to the frequency characteristics of the output impedance of the buffer circuit 50A. Here, it is preferable that the operational amplifier 52*a* in the buffer circuit 50A and the operational amplifier 52*b* in the buffer circuit 50B are obtained from the same wafer in order to match the frequency characteristics of the buffer circuit 50A with the frequency characteristics of the buffer circuit 50B. The bias potential Vcc, which is output from the buffer circuit 50B, is supplied to the positive input terminal of the operational amplifier 11 via the resistance element R2*p*, and the input audio signal Vin which is output from the buffer circuit 50A is supplied to the negative input terminal of the operational amplifier 11 via the resistance element R1*n*. The frequency characteristic of an impedance of a supply side that supplies the bias potential Vcc when viewed from the positive input terminal of the operational amplifier 11 to which the bias potential Vcc, on which AC potential difference Vn is multiplexed, is supplied can be made approximately equal to the frequency characteristic of an impedance of a supply side that supplies the input audio signal Vin when viewed from the negative input terminal of the operational amplifier 11 to which the input audio signal Vin, on which the AC potential difference Vn is multiplexed, is supplied. As a result, even if the frequency characteristics of the gains of the operational amplifier 52*a* and the operational amplifier 52*b* are reduced in the high frequency band, it is possible to reduce a decrease in the CMRR at the high frequency band.

In the audio signal inputter 30C (see FIG. 10B) described above, the audio signal V is supplied to the audio signal inputter 30B from the buffer circuits 50B and 50A in the differential form, but it is also possible that the bias potential Vcc is output from the buffer circuit 50B and the single-ended audio signal V is output from the buffer circuit 50A.

Figure 11B:
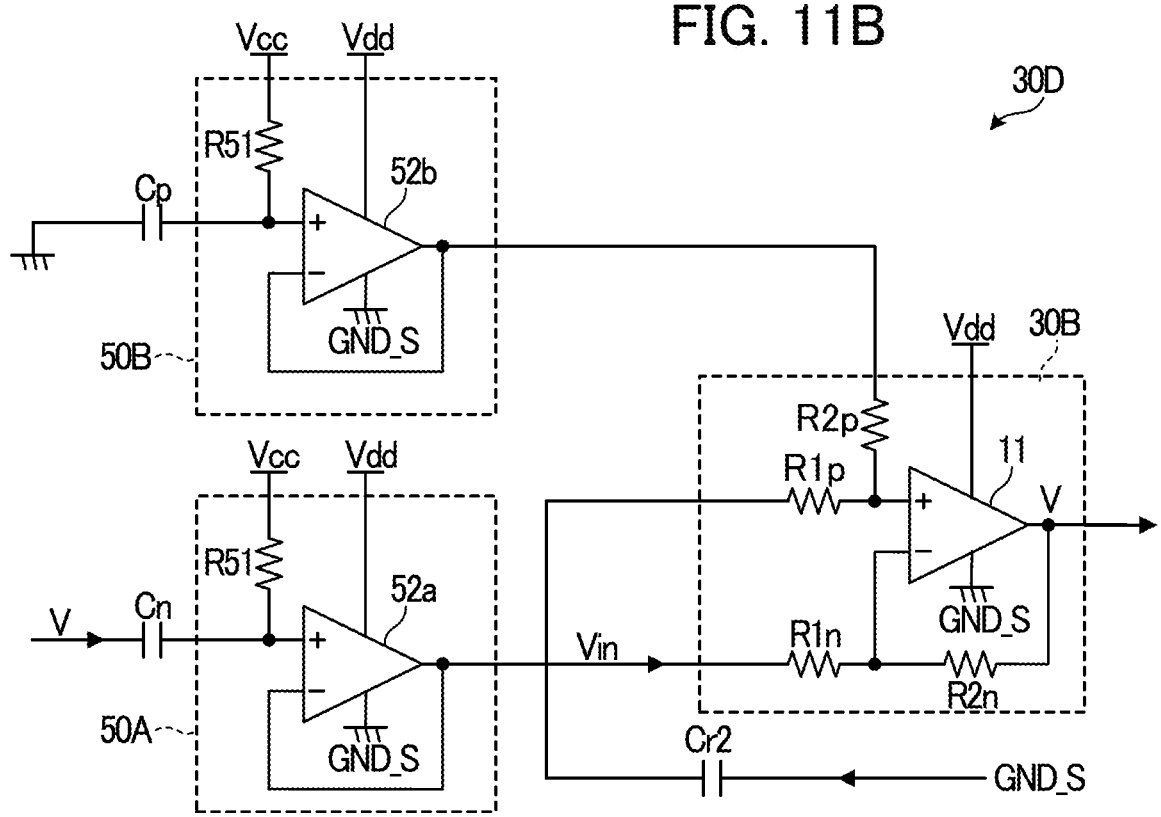
FIG. 11B is a circuit diagram illustrating a configuration of an audio signal inputter 30D according to a modification.

FIG. 11B is a circuit diagram illustrating a configuration of an audio signal inputter 30D according to a modification. The audio signal inputter 30D is, for example, audio signal input circuitry. The audio signal inputter 30D includes the buffer circuit 50A, the buffer circuit 50B, and the audio signal inputter 30B. Similarly to the audio signal outputter 10D described with reference to FIG. 11A, the audio signal inputter 30D can reduce a decrease in CMRR at the high frequency band even if the frequency characteristics of the gains of the operational amplifiers 52*a* and 52*b* are reduced in the high frequency band.

(4) Although a bipolar transistor is illustrated as an example in each of the embodiments described above, this disclosure is not limited thereto, and a unipolar transistor may also be used. For example, an N-channel field effect transistor may be used instead of an NPN-type bipolar transistor. Alternatively, a P-channel field effect transistor may be used instead of a PNP-type bipolar transistor.

(5) In the embodiments described above, an analog audio signal is indicated as an example of the transmission signal transmitted by using the first line L1 and the second line L2, but this disclosure is not limited thereto. The transmission signal may be, for example, a digital signal, an analog video signal, or a digital audio signal. That is, the first line L1 may be used to transmit a first signal of the analog signal or digital signal from the transmitting apparatus 100 to the receiving apparatus 200.

(6) In the embodiments described above, the data signal D represents a logic level of 2 values, but the data signal D may be the direct current, which indicates 3 or more values. In this case, the data signal transmitters 20A and 20B may be configured to include a constant current source in order to output a direct current, a magnitude of which is changed in accordance with the data signal to be transmitted. At least one of the data signal transmitters 20A and 20B may be formed of a DA converter using a ladder resistor of R-2R type. The DA converter receives a voltage and outputs a direct current that indicates 3 or more values.

(7) The signal transmitting systems 1A, 1B, 1C, 1D and 1E according to the embodiments described above can be applied to an emergency notification system in a vehicle. The emergency notification system communicates with a management center when an emergency occurs in a vehicle. The emergency notification system includes a communication apparatus configured to transmit and receive an audio signal indicative of sound, and data to and from the management center, and an audio processing apparatus connected to a microphone and a speaker.

The audio signal is transmitted from the communication apparatus (the above-described transmitting apparatus) to the audio processing apparatus (the above-described receiving apparatus) using the first line L1. Therefore, audio sound from the management center can be output from the speaker.

In addition, when the communication apparatus detects a certain failure, it is possible to transmit notification of the failure to the audio processing apparatus by using the transmission of the data signal via the first line L1 or the second line L2. Further, when a data signal transmitter is provided in the audio processing apparatus and a data signal receiver is provided in the communication apparatus, the failure detected by the audio processing apparatus can be transmitted to the communication apparatus.

(8) In each of the above-described embodiments and each of modifications, the first line L1 or the second line L2 is used to transmit the data signal D from the transmitting apparatus 100 to the receiving apparatus 200 or to transmit the data signal D from the receiving apparatus 200 to the transmitting apparatus 100. However, the data signal D may be transmitted from the transmitting apparatus 100 to the receiving apparatus 200 by using the first line L1, and the data signal D may be transmitted from the receiving apparatus 200 to the transmitting apparatus 100 by using the second line L2. The data signal D may be transmitted from the transmitting apparatus 100 to the receiving apparatus 200 by using the second line L2, and the data signal D may be transmitted from the receiving apparatus 200 to the transmitting apparatus 100 by using the first line L1.

(9) In each of the above-described embodiments and modifications, each of the data signal transmitters 20A and 20B provided in the transmitting apparatus 100, and each of the data signal receivers 40A and 40B provided in the transmitting apparatus 100 acts as a communicator (first communicator) configured to transmit the data signal D (second signal) from the transmitting apparatus 100 to the receiving apparatus 200, or to receive the data signal D from the receiving apparatus 200 by detecting the magnitude of the direct current flowing in the second line L2.

In addition, each of the data signal transmitters 20A and 20B provided in the receiving apparatus 200, and each of the data signal receivers 40A and 40B provided in the receiving apparatus 200 acts as a communicator (second communicator) configured to transmit the data signal D (second signal) from the receiving apparatus 200 to the transmitting apparatus 100 or to receive the data signal D from the transmitting apparatus 100 by detecting the magnitude of the direct current flowing in the second line L2.

6. Aspects Understood from at Least One of Embodiments and Modifications

The following aspects are understood from one of the embodiments and the modifications described above. A transmitting apparatus according to an aspect of this disclosure includes a first signal outputter configured to output a first signal to a receiving apparatus via a first line; and a communicator connected to a second line that connects a receiving-side ground node and the first signal outputter with an AC connection, the receiving-side ground node being supplied with a ground potential of the receiving apparatus, and the communicator being configured to transmit a second signal from the transmitting apparatus to the receiving apparatus by causing a direct current, a magnitude of which changes based on a logic level of the second signal, to flow in the second line, or to receive the second signal from the receiving apparatus by detecting a magnitude of a direct current flowing in the second line.

When the second signal different from the first signal is transmitted or received by using the magnitude of the direct current flowing via the first line, the AC potential difference between the ground potential of the receiving apparatus and the ground potential of the transmitting apparatus is entered as a noise voltage into the first line. When the direct current flowing via the first line is changed in accordance with the logic level of the second signal, the direct current is modulated in accordance with the first signal. Therefore, it is necessary to filter the AC component in order to generate a second signal in the receiving apparatus.

According to this aspect, the second signal is transmitted or received between the transmitting apparatus and the receiving apparatus using the second line. Therefore, it is possible to reduce a noise voltage entered in the first signal as compared to a configuration where the second signal is transmitted or received by using the first line. Moreover, the second line is connected to the receiving-side ground node with an AC connection. Therefore, the direct current for transmitting the second signal is not modulated by the first signal, and the direct current flowing in the second line can be detected. Consequently, the data signal can be easily generated based on the detection result.

According to one aspect of the transmitting apparatus described above, preferably, the communicator is a first communicator, the receiving apparatus includes a second communicator connected to the second line, the second communicator being configured to transmit the second signal from the receiving apparatus to the transmitting apparatus by causing a direct current, a magnitude of which changes based on the logic level of the second signal, to flow in the second line, or to receive the second signal from the transmitting apparatus by detecting a magnitude of a direct current flowing in the second line, the first signal outputter generates the first signal by canceling an AC potential difference from an input signal, on which the AC potential difference is multiplexed, by using a ground potential of the receiving apparatus obtained via the second line, the AC potential difference being an alternating potential difference between a ground potential of the transmitting apparatus and the ground potential of the receiving apparatus, and a first impedance of the first communicator when viewed from the second line being higher than a second impedance of the second communicator when viewed from the second line.

When the second signal is transmitted by using the magnitude of the direct current flowing via the second line, a path is required that causes the direct current to flow in the transmitting-side ground node of the transmitting apparatus. The AC potential difference is entered as a noise voltage in the second line via this path. The noise voltage is obtained by dividing the AC potential difference by the first impedance and the second impedance. In this aspect, the first impedance of the first communicator in the transmitting apparatus that cancels the AC potential difference is higher than the second impedance. Therefore, it is possible to reduce the noise voltage that is entered into the second line.

In one aspect of the transmitting apparatus described above, it is preferable that the first communicator includes a constant current circuit configured to cause the direct current, the magnitude of which changes based on the logic level of the second signal, to flow in the second line.

By employing the constant current circuit, the first impedance of the first communicator when viewed from the second line can be increased. Therefore, the noise voltage generated when the AC potential difference is entered into the second line can be reduced. As a result, the SN ratio of the first signal can be increased.

Another aspect of a transmitting apparatus includes a first signal outputter connected to a second line that is connected with an AC connection to a receiving-side ground node, the receiving-side ground node being supplied with a ground potential of a receiving apparatus, the first signal outputter being configured to generate a first signal by canceling an AC potential difference from an input signal, on which the AC potential difference is multiplexed, by using a ground potential of the receiving apparatus obtained via the second line, the AC potential difference being an alternating potential difference between a ground potential of the transmitting apparatus and the ground potential of the receiving apparatus, and to output the first signal to the receiving apparatus via the first line; and a communicator that includes a constant current circuit configured to cause a direct current, a magnitude of which changes based on a logic level of a second signal, to flow in the first line, the communicator being configured to transmit the second signal from the transmitting apparatus to the receiving apparatus.

According to this aspect, the transmitting apparatus includes the constant current circuit configured to cause the direct current whose magnitude changes based on the logic level of the second signal to flow in the first line. The AC potential difference is divided by the impedance of the constant current circuit and the impedance of the first line, and the divided voltage is entered into the first line as a noise voltage. Since the impedance of the constant current circuit is large, it is possible to reduce the noise voltage entered into the first line.

In the one aspect or the other aspect of the transmitting apparatus described above, preferably, the first signal outputter includes an operational amplifier including: a positive input terminal; a negative input terminal; and an output terminal connected to the negative input terminal via a resistance element, the input signal is supplied to the negative input terminal via a resistance element, a bias potential is applied to the positive input terminal via at least a resistance element, and $Z2p/Z1p$ and $Z2n/Z1n$ are substantially equal to each other, where $Z1p$ is an impedance of a side of the second line when viewed from the positive input terminal, $Z2p$ is an impedance of a supply side that supplies the bias potential when viewed from the positive input terminal, $Z1n$ is an impedance of a supply side that supplies the input signal when viewed from the negative input terminal, and $Z2n$ is an impedance of the output terminal when viewed from the negative input terminal.

According to this aspect, since $Z2p/Z1p$ and $Z2n/Z1n$ are substantially equal to each other, the AC potential difference can be canceled from the input signal on which the AC potential difference is multiplexed.
As a result, the CMRR can be improved.

According to the one aspect or the other aspect of the transmitting apparatus described above, preferably, the first signal outputter includes: an operational amplifier including: a negative input terminal; and a positive input terminal connected to the receiving-side ground node with an AC connection via a resistance element and the second line, the positive input terminal being supplied, via a resistance element, with a bias potential, on which the AC potential difference is multiplexed, and a differential signal generating circuit configured to generate, based on the input signal, both a positive-phase signal and an inverted-phase signal obtained by inverting the positive-phase signal; a first buffer circuit configured to supply the positive-phase signal to one of the positive input terminal and the negative input terminal of the operational amplifier via a resistance element; and a second buffer circuit configured to supply the inverted-phase signal to the other one of the positive input terminal and the negative input terminal of the operational amplifier via a resistance element, and the second buffer circuit having an output impedance substantially equal to an output impedance of the first buffer circuit.

According to this aspect, the output impedances of the first buffer circuit and the second buffer circuit are substantially equal to each other. Therefore, the AC potential difference multiplexed on the positive-phase signal is an in-phase noise of the AC potential difference multiplexed on the inverted-phase signal. Accordingly, the AC potential difference multiplexed on the positive-phase signal and the AC potential difference multiplexed on the inverted-phase signal can be canceled with high accuracy.

According to one aspect of the transmitting apparatus described above, preferably, the first signal outputter includes: an operational amplifier including: a negative input terminal; and a positive input terminal connected to the receiving-side ground node with an AC connection via a resistance element and the second line; a first buffer circuit configured to supply the input signal to the negative input terminal of the operational amplifier via a resistance element; and a second buffer circuit configured to apply a bias potential, on which the AC potential difference is multiplexed, to the positive input terminal of the operational amplifier via a resistance element, the second buffer circuit having an output impedance substantially equal to an output impedance of the first buffer circuit.

According to this aspect, the output impedance of the first buffer circuit and the output impedance of the second buffer circuit are substantially equal to each other. Therefore, even when the output impedances of the first buffer circuit and the second buffer circuit are increased at the high frequency band, the AC potential difference can be canceled with high accuracy.

A receiving apparatus according to an aspect of this disclosure includes a first signal inputter configured to receive a first signal from a transmitting apparatus via a first line; a communicator connected to a second line that connects a transmitting-side ground node and the first signal inputter with an AC connection, the transmitting-side ground node being supplied with a ground potential of the transmitting apparatus, the communicator being configured to transmit a second signal from the receiving apparatus to the transmitting apparatus by causing a direct current, a magnitude of which changes based on a logic level of the second signal, to flow in the second line, or to receive the second signal from the transmitting apparatus by detecting a magnitude of a direct current flowing in the second line.

According to this aspect, the second signal is transmitted or received between the transmitting apparatus and the receiving apparatus using the second line. Therefore, it is possible to reduce a noise voltage entered in the first signal as compared to a configuration where the second signal is transmitted or received by using the first line. Moreover, the second line is connected to the receiving-side ground node with an AC connection. Consequently, the direct current for transmitting the second signal is not modulated by the first signal. Therefore, according to this aspect, the direct current flowing via the second line can be detected, and the second signal can easily be generated based on the detection result.

According to one aspect of the receiving apparatus described above, the communicator is a second communicator, the transmitting apparatus includes a first communicator connected to the second line, the first communicator being configured to transmit the second signal from the transmitting apparatus to the receiving apparatus by causing a direct current, a magnitude of which changes based on the logic level of the second signal, to flow in the second line, or to receive the second signal from the receiving apparatus by detecting a magnitude of a direct current flowing in the second line, the first signal inputter generates an output signal by canceling an AC potential difference from the first signal, on which the AC potential difference is multiplexed, by using the ground potential of the transmitting apparatus obtained via the second line, the AC potential difference being an alternating potential difference between the ground potential of the transmitting apparatus and a ground potential of the receiving apparatus, and a second impedance of the second communicator when viewed from the second line is higher than a first impedance of the first communicator when viewed from the second line.

When the second signal is transmitted by using the magnitude of the direct current flowing via the second line, a path is required that causes the direct current to flow in the transmitting-side ground node of the transmitting apparatus. The AC potential difference is entered as a noise voltage in the second line via this path. The noise voltage is obtained by dividing the AC potential difference by the first impedance and the second impedance. In this aspect, the second impedance of the second communicator in the receiving apparatus that cancels the AC potential difference is higher than the first impedance. Therefore, it is possible to reduce the noise voltage that is entered into the second line.

In one aspect of the receiving apparatus described above, it is preferable that the second communicator includes a constant current circuit configured to cause the direct current, a magnitude of which changes based on the logic level of the second signal, to flow in the second line.

By employing the constant current circuit, the second impedance of the second communicator when viewed from the second line can be increased. Therefore, the noise voltage generated when the AC potential difference is entered into the second line can be reduced. As a result, the SN ratio of the output signal can be increased.

Another aspect of a receiving apparatus according to this disclosure includes: a first signal inputter connected to a second line that is connected with an AC connection to a transmitting-side ground node, the transmitting-side ground node being supplied with a ground potential of a transmitting apparatus, the first signal inputter being configured to generate an output signal by canceling an AC potential difference from a first signal, on which the AC potential difference is multiplexed, by using the ground potential of the transmitting apparatus obtained via the second line, the AC potential difference being an alternating potential difference between the ground potential of the transmitting apparatus and a ground potential of the receiving apparatus, and to output the output signal; a communicator that includes a constant current circuit configured to cause a direct current, a magnitude of which changes based on a logic level of a second signal, to flow in the first line, the communicator being configured to transmit the second signal from the receiving apparatus to the transmitting apparatus.

According to this aspect, the constant current circuit of the receiving apparatus is configured to cause the direct current whose magnitude changes based on the logic level of the second signal to flow in the first line. The AC potential difference is divided by the impedance of the constant current circuit and the impedance of the first line, and the divided voltage is entered on the first line as a noise voltage. Since the impedance of the constant current circuit is large, it is possible to reduce the noise voltage entered into the first line.

In one aspect of the receiving apparatus described above, preferably, the first signal inputter includes an operational amplifier including: a positive input terminal; a negative input terminal; and an output terminal connected to the negative input terminal via a resistance element, the first signal is supplied to the negative input terminal via a resistance element, a bias potential is applied to the positive input terminal via at least a resistance element, and $Z2p/Z1p$ and $Z2n/Z1n$ are substantially equal to each other, where $Z1p$ is an impedance of a side of the second line when viewed from the positive input terminal, $Z2p$ is an impedance of a supply side that supplies the bias potential when viewed from the positive input terminal, $Z1n$ is an impedance of a supply side that supplies the first signal when viewed from the negative input terminal, and $Z2n$ is an impedance of the output terminal when viewed from the negative input terminal.

According to this aspect, since $Z2p/Z1p$ and $Z2n/Z1n$ are substantially equal to each other, the frequency characteristic of the AC potential difference multiplexed on the first signal and the frequency characteristic of the AC potential difference to be cancelled can be made substantially equal to each other, thereby making it possible to increase the CMRR.

According to one aspect of the receiving apparatus described above, the first signal inputter includes: an operational amplifier including: a negative input terminal; and a positive input terminal connected to the transmitting-side ground node with an AC connection via a resistance element and the second line, the positive input terminal being supplied with a bias potential, on which the AC potential difference is multiplexed, via a resistance element, and a differential signal generating circuit configured to generate, based on the first signal, both a positive-phase signal and an inverted-phase signal obtained by inverting the positive-phase signal; a first buffer circuit configured to supply the positive-phase signal to one of the positive input terminal and the negative input terminal of the operational amplifier via a resistance element; and a second buffer circuit configured to supply the inverted-phase signal to the other one of the positive input terminal and the negative input terminal of the operational amplifier via a resistance element, and the second buffer circuit having an output impedance substantially equal to an output impedance of the first buffer circuit.

According to this aspect, the output impedances of the first buffer circuit and the second buffer circuit are substantially equal to each other. Therefore, the AC potential difference multiplexed on the positive-phase signal is an in-phase noise of the AC potential difference multiplexed on the inverted-phase signal. Accordingly, the AC potential difference multiplexed on the positive-phase signal and the AC potential difference multiplexed on the inverted-phase signal can be canceled with high accuracy.

According to one aspect of the receiving apparatus described above, the first signal inputter includes an operational amplifier including: a negative input terminal; and a positive input terminal connected to the transmitting-side ground node with an AC connection via a resistance element and the second line; a first buffer circuit configured to supply the first signal to the negative input terminal of the operational amplifier via a resistance element; and a second buffer circuit configured to apply a bias potential, on which the AC potential difference is multiplexed, to the positive input terminal of the operational amplifier via a resistance element, and the second buffer circuit having an output impedance substantially equal to an output impedance of the first buffer circuit.

According to this aspect, the output impedance of the first buffer circuit and the output impedance of the second buffer circuit are substantially equal to each other. Therefore, even when the output impedances of the first buffer circuit and the second buffer circuit are increased at the high frequency band, the AC potential difference can be canceled with high accuracy.

DESCRIPTION OF REFERENCE SIGNS 1A, 1B, 1C, 1D, 1E: signal transmitting system, 10A, 10B, 10C, 10D: audio signal outputter, 20A, 20B: data signal transmitter, 30A, 30B, 30C, 30D: audio signal inputter, 40A, 40B: data signal receiver, 50A, 50B: buffer circuits, 100: transmitting apparatus, 200: receiving apparatus, L1: first line, L2: second line, Nsg: transmitting-side ground node, Nrg: receiving-side ground node, Cr1: first receiving-side capacitance element, Cr2: second receiving-side capacitance element, Cs1: first transmitting-side capacitance element, Cs2: second transmitting-side capacitance element.

What is claimed is:

1. A transmitting apparatus comprising:
   a first signal outputter configured to output a first signal to a receiving apparatus via a first line; and
   a communicator connected to a second line that connects a receiving-side ground node and the first signal outputter with an AC connection, the receiving-side ground node being configured to be supplied with a ground potential of the receiving apparatus, and the communicator being configured to transmit a second signal from the transmitting apparatus to the receiving apparatus by causing a direct current, having a magnitude configured to change based on a logic level of the second signal, to flow in the second line, or being configured to receive the second signal from the receiving apparatus by detecting a magnitude of a direct current flowing in the second line.

2. The transmitting apparatus according to claim 1, wherein
   the communicator is a first communicator,
   the receiving apparatus includes a second communicator connected to the second line, the second communicator being configured to transmit the second signal from the receiving apparatus to the transmitting apparatus by causing a direct current, having a magnitude configured to change based on the logic level of the second signal, to flow in the second line, or being configured to receive the second signal from the transmitting apparatus by detecting a magnitude of a direct current flowing in the second line,
   the first signal outputter is configured to generate the first signal by canceling an AC potential difference from an input signal, on which the AC potential difference is multiplexed, by being connected to the ground potential of the receiving apparatus via the second line, the AC potential difference being an alternating potential difference between a ground potential of the transmitting apparatus and the ground potential of the receiving apparatus, and
   a first impedance of the first communicator when viewed from the second line is higher than a second impedance of the second communicator when viewed from the second line.

3. The transmitting apparatus according to claim 2, wherein
   the first communicator includes a constant current circuit configured to cause the direct current, having the magnitude configured to change based on the logic level of the second signal, to flow in the second line.

4. The transmitting apparatus according to claim 1, wherein the communicator is configured to transmit the second signal of a predetermined logic level from the transmitting apparatus to the receiving apparatus by causing no direct current to flow in the second line, or is configured to receive the second signal of the predetermined logic level from the receiving apparatus by detecting no direct current flowing in the second line.

5. A transmitting apparatus comprising:
   a first signal outputter connected to a second line that is connected with an AC connection to a receiving-side ground node, the receiving-side ground node being configured to be supplied with a ground potential of a receiving apparatus, the first signal outputter being configured to generate a first signal by canceling an AC potential difference from an input signal, on which the AC potential difference is multiplexed, by being connected to the ground potential of the receiving apparatus via the second line, the AC potential difference being an alternating potential difference between a ground potential of the transmitting apparatus and the ground potential of the receiving apparatus, and to output the first signal to the receiving apparatus via a first line; and
   a communicator that includes a constant current circuit configured to cause a direct current, having a magnitude configured to change based on a logic level of a second signal, to flow in the first line to thereby transmit the second signal from the transmitting apparatus to the receiving apparatus.

6. The transmitting apparatus according to claim 2, wherein
   the first signal outputter includes an operational amplifier including: a positive input terminal; a negative input terminal; and an output terminal connected to the negative input terminal via a resistance element;
   the input signal is supplied to the negative input terminal via a resistance element,
   a bias potential is supplied to the positive input terminal via at least a resistance element, and
   $Z2p/Z1p$ and $Z2n/Z1n$ are substantially equal to each other, where $Z1p$ is an impedance of a side of the second line when viewed from the positive input terminal, $Z2p$ is an impedance of a supply side configured to supply the bias potential when viewed from the positive input terminal, $Z1n$ is an impedance of a supply side configured to supply the input signal when viewed from the negative input terminal, and $Z2n$ is an impedance of the output terminal when viewed from the negative input terminal.

7. The transmitting apparatus according to claim 2, wherein
   the first signal outputter includes:
   an operational amplifier including: a negative input terminal; and a positive input terminal connected to the receiving-side ground node with an AC connection via a resistance element and the second line, the positive input terminal being configured to be supplied with a bias potential, on which the AC potential difference is multiplexed, via a resistance element;
   a differential signal generating circuit configured to generate, based on the input signal, both a positive-phase signal and an inverted-phase signal obtained by inverting the positive-phase signal;
   a first buffer circuit configured to supply the positive-phase signal to one of the positive input terminal and the negative input terminal of the operational amplifier via a resistance element; and
   a second buffer circuit configured to supply the inverted-phase signal to the other one of the positive input terminal and the negative input terminal of the operational amplifier via a resistance element, and the second buffer circuit having an output impedance substantially equal to an output impedance of the first buffer circuit.

8. The transmitting apparatus according to claim 2, wherein
the first signal outputter includes:
an operational amplifier including: a negative input terminal; and a positive input terminal connected to the receiving-side ground node with an AC connection via a resistance element and the second line;
a first buffer circuit configured to supply the input signal to the negative input terminal of the operational amplifier via a resistance element; and
a second buffer circuit configured to apply a bias potential, on which the AC potential difference is multiplexed, to the positive input terminal of the operational amplifier via a resistance element, and the second buffer circuit having an output impedance substantially equal to an output impedance of the first buffer circuit.

9. A receiving apparatus comprising:
a first signal inputter configured to receive a first signal from a transmitting apparatus via a first line; and
a communicator connected to a second line that connects a transmitting-side ground node and the first signal inputter with an AC connection, the transmitting-side ground node being configured to be supplied with a ground potential of the transmitting apparatus, the communicator being configured to transmit a second signal from the receiving apparatus to the transmitting apparatus by causing a direct current, having a magnitude configured to change based on a logic level of the second signal, to flow in the second line, or being configured to receive the second signal from the transmitting apparatus by detecting a magnitude of a direct current flowing in the second line.

10. The receiving apparatus according to claim 9, wherein
the communicator is a second communicator,
the transmitting apparatus includes a first communicator connected to the second line, the first communicator being configured to transmit the second signal from the transmitting apparatus to the receiving apparatus by causing a direct current, having a magnitude configured to change based on the logic level of the second signal, to flow in the second line, or being configured to receive the second signal from the receiving apparatus by detecting a magnitude of a direct current flowing in the second line,
the first signal inputter is configured to generate an output signal by canceling an AC potential difference from the first signal, on which the AC potential difference is multiplexed, by being connected to the ground potential of the transmitting apparatus via the second line, the AC potential difference being an alternating potential difference between the ground potential of the transmitting apparatus and a ground potential of the receiving apparatus, and
a second impedance of the second communicator when viewed from the second line is higher than a first impedance of the first communicator when viewed from the second line.

11. The receiving apparatus according to claim 10, wherein
the second communicator includes a constant current circuit configured to cause the direct current, having the magnitude configured to change based on the logic level of the second signal, to flow in the second line.

12. A receiving apparatus comprising:
a first signal inputter connected to a second line that is connected with an AC connection to a transmitting-side ground node, the transmitting-side ground node being configured to be supplied with a ground potential of the transmitting apparatus, the first signal inputter being configured to generate an output signal by canceling an AC potential difference from a first signal, on which the AC potential difference is multiplexed, by being connected to the ground potential of the transmitting apparatus via the second line, the AC potential difference being an alternating potential difference between the ground potential of the transmitting apparatus and a ground potential of the receiving apparatus, and to output the output signal; and
a communicator that includes a constant current circuit configured to cause a direct current, having a magnitude configured to change based on a logic level of a second signal, to flow in the first line to thereby transmit the second signal from the receiving apparatus to the transmitting apparatus.

13. The receiving apparatus according to claim 10, wherein
the first signal inputter includes an operational amplifier including: a positive input terminal; a negative input terminal; and an output terminal connected to the negative input terminal via a resistance element;
the first signal is supplied to the negative input terminal via a resistance element,
a bias potential is supplied to the positive input terminal via at least a resistance element; and
$Z2p/Z1p$ and $Z2n/Z1n$ are substantially equal to each other, where $Z1p$ is an impedance of a side of the second line when viewed from the positive input terminal, $Z2p$ is an impedance of a supply side configured to supply the bias potential when viewed from the positive input terminal, $Z1n$ is an impedance of a supply side configured to supply the first signal when viewed from the negative input terminal, and $Z2n$ is an impedance of the output terminal when viewed from the negative input terminal.

14. The receiving apparatus according to claim 10, wherein
the first signal inputter includes:
an operational amplifier including: a negative input terminal; and a positive input terminal connected to the transmitting-side ground node with an AC connection via a resistance element and the second line, the positive input terminal being configured to be supplied with a bias potential, on which the AC potential difference is multiplexed, via a resistance element;
a differential signal generating circuit configured to generate, based on the first signal, both a positive-phase signal and an inverted-phase signal obtained by inverting the positive-phase signal;
a first buffer circuit configured to supply the positive-phase signal to one of the positive input terminal and the negative input terminal of the operational amplifier via a resistance element; and
a second buffer circuit configured to supply the inverted-phase signal to the other one of the positive input terminal and the negative input terminal of the operational amplifier via a resistance element, and the second buffer circuit having an output impedance substantially equal to an output impedance of the first buffer circuit.

15. The receiving apparatus according to claim 10, wherein
the first signal inputter includes:
an operational amplifier including: a negative input terminal; and a positive input terminal connected to the transmitting-side ground node with an AC connection via a resistance element and the second line;
a first buffer circuit configured to supply the first signal to the negative input terminal of the operational amplifier via a resistance element; and
a second buffer circuit configured to apply a bias potential, on which the AC potential difference is multiplexed, to the positive input terminal of the operational amplifier via a resistance element, and the second buffer circuit having an output impedance substantially equal to an output impedance of the first buffer circuit.

* * * * *